United States Patent
Rowland

(10) Patent No.: US 12,058,149 B2
(45) Date of Patent: Aug. 6, 2024

(54) COMPUTER INVESTIGATION METHOD AND SYSTEM

(71) Applicant: Craig Rowland, Christchurch (NZ)

(72) Inventor: Craig Rowland, Christchurch (NZ)

(73) Assignee: Sandfly Security Limited, Christchurch (NZ)

( * ) Notice: Subject to any disclaimer, the term of this patent is extended or adjusted under 35 U.S.C. 154(b) by 751 days.

(21) Appl. No.: 16/969,472

(22) PCT Filed: Feb. 13, 2019

(86) PCT No.: PCT/NZ2019/050013
§ 371 (c)(1),
(2) Date: Aug. 12, 2020

(87) PCT Pub. No.: WO2019/160427
PCT Pub. Date: Aug. 22, 2019

(65) Prior Publication Data
US 2021/0058412 A1    Feb. 25, 2021

(30) Foreign Application Priority Data
Feb. 13, 2018   (NZ) ........................................ 739874

(51) Int. Cl.
*H04L 9/40* (2022.01)
*H04L 9/08* (2006.01)

(52) U.S. Cl.
CPC ........ *H04L 63/1416* (2013.01); *H04L 9/0825* (2013.01); *H04L 63/1433* (2013.01)

(58) Field of Classification Search
CPC .............. H04L 63/1416; H04L 9/0825; H04L 63/1433
(Continued)

(56) References Cited

U.S. PATENT DOCUMENTS 9,088,606 B2   7/2015   Ranum et al.
9,438,631 B2   9/2016   Bettini et al.
(Continued)

OTHER PUBLICATIONS

Tang, H. et al. "VirtAV: an Agentless Runtime Antivirus System for Virtual Machines" KSII Transactions on Internet and Informatoni System vol. 11, No. 11, pp. 5642-5670, Nov. 30, 2017.
(Continued)

*Primary Examiner* — Teshome Hailu
(74) *Attorney, Agent, or Firm* — Gardner, Linn, Burkhart & Ondersma LLP

(57) ABSTRACT

A method of investigating a host computer uses an investigation system remote to the host computer. The investigation system includes at least one computer system. The method includes establishing a connection with the remote host computer, and sending at least one investigative module to the host computer. The at least one investigative module is configured to run on the host computer to perform at least one investigative function on the host computer. The at least one investigative module includes an agentless computer program configured to run on the host computer to perform at least one investigative function on the host computer to investigate the host computer to ascertain if the host computer has any data or process (hereinafter collectively referred to as data forms) with suspicious attributes.

39 Claims, 11 Drawing Sheets

(58) Field of Classification Search
USPC .......................................................... 726/23
See application file for complete search history.

(56) References Cited

U.S. PATENT DOCUMENTS

| | | | |
|---|---|---|---|
| 9,667,648 B2 | 5/2017 | Teddy et al. | |
| 9,729,572 B1* | 8/2017 | Adams | G06F 21/52 |
| 2002/0104014 A1* | 8/2002 | Zobel | G06F 21/577 |
| | | | 726/26 |
| 2004/0209617 A1* | 10/2004 | Hrastar | H04W 24/00 |
| | | | 455/434 |
| 2010/0043066 A1* | 2/2010 | Miliefsky | H04L 63/0263 |
| | | | 726/9 |
| 2010/0313271 A1* | 12/2010 | Johnson | G06F 21/56 |
| | | | 726/24 |
| 2010/0333199 A1* | 12/2010 | Gianoulakis | G06F 21/577 |
| | | | 726/22 |
| 2011/0283355 A1* | 11/2011 | Livshits | G06F 8/70 |
| | | | 709/224 |
| 2013/0269028 A1* | 10/2013 | Nakawatase | H04L 63/1433 |
| | | | 726/22 |
| 2014/0109170 A1* | 4/2014 | Nemiroff | G06F 21/78 |
| | | | 726/1 |
| 2016/0099960 A1 | 4/2016 | Gerritz et al. | |
| 2017/0366563 A1 | 12/2017 | Volfman et al. | |

OTHER PUBLICATIONS

International Search Report and Written Opinion of the International Searching Authority from corresponding Patent Cooperation Treaty (PCT) Application No. PCT/NZ2019/050013, indicated completed on May 8, 2019.

International Preliminary Examination Report from corresponding Patent Cooperation Treaty (PCT) Application No. PCT/NZ2019/050013, completed Jan. 21, 2020.

Webpage screenshot from https://en.wikipedia.org/wiki/Ansible_(software), accessed before Feb. 13, 2018.

Webpage screenshot from https://en.wikipedia.org/wiki/Nagios, accessed before Feb. 13, 2018.

Webpage screenshot from https://en.wikipedia.org/wiki/OSSEC, accessed before Feb. 13, 2018.

Webpage screenshot from https://success.trendmicro.com/solution/1060889-advantages-and-limitations-of-agentless-integrity-monitoring, accessed Aug. 11, 2020, believed to have been published prior to Feb. 13, 2018.

Webpage screenshot from https://www.cylance.com, accessed before Feb. 13, 2018.

Webpage screenshot from https://www.carbonblack.com, accessed before Feb. 13, 2018.

Webpage screenshot from https://www.crowdstrike.com, accessed before Feb. 13, 2018.

Webpage screenshot from https://www.tanium.com, accessed before Feb. 13, 2018.

* cited by examiner

COMPUTER INVESTIGATION METHOD AND SYSTEM

CROSS REFERENCE TO RELATED APPLICATIONS

The present application is § 371 national stage of International Application PCT/NZ2019/050013, filed Feb. 13, 2019, which claims priority benefit of New Zealand Pat. Application Ser. No. 739874, filed Feb. 13, 2018, both of which are hereby incorporated herein by reference in their entireties.

FIELD OF THE INVENTION

The invention relates to methods, systems and software for investigating computer systems for intrusion, malware or other threats.

In particular, the invention relates to an investigation system, method and software for identifying intrusion, malware or other threats on a remote computer system.

BACKGROUND OF THE INVENTION

Computer security software is used herein as a generalised term to describe computer programs with anti-virus, anti-malware, anti-phishing, anti-intrusion or other functionality used to maintain computer operability and data-security. Various forms of computer security software are well-known and typically run on a host computer to scan for intrusion, malware or other problems on the host computer.

However, often such security software has a high-performance load on the system as the software requires use of the CPU and RAM to scan many files, services and processes to ensure that the computer is not compromised. Some software may be run on user demand, on a schedule or upon certain parameters being met, e.g. the CPU load on the computer is low.

In computer servers, both security and performance are a high priority and so security scans are typically scheduled to run when the server is not under high load or at particular times when the server is not expected to be under high-demand.

Common to most security software is that a computer program must be installed on the host computer to be scanned, (i.e. what is known in the art as a "software agent") is required on the host computer, being a computer program(s) either fully capable of conducting security scans without other data or conducting scans using data received from another computer, e.g. from a master server. A "software agent" is a computer program that needs to be loaded on each system to be monitored.

Software agents are notoriously unreliable and cause problems for network administrators e.g. software agents require constant updates and can cause conflicts with other system updates that need to be installed. Agents, even when idle, also constantly use a proportion of the capacity of the CPU, RAM, and other system resources. A software agent that requires an average of a relatively conservative 5% CPU time means the operator of the host computer may need to operate 5% more host computers (e.g. servers) to perform the tasks required due to the occupied CPU resource. This is a significant cost for a large enterprise for no actual gain in security.

Furthermore, when agents need to be updated, administrators must update the agent on every single host computer that agent is installed on. This process is fraught with problems and requires extensive testing to be sure the updates will not cause conflicts or failures with other loaded software. Moreover, there is considerable risk in automated deployment and upgrade of agents across the network. Any problem caused by the agent or upgrade may impact countless hosts and cause serious disruptions to network operations.

In contrast, "agentless" approaches to security require no software to be loaded on the host that needs protection, and thus have no resource impact on the host computer when not active.

Investigation systems that require an agent on the host computer also have the disadvantage of potentially alerting intruders to the agent's presence and therefore warning the intruder that security is present. The intruder may then take steps to avoid detection, disable the agent or provide false data to the agent and associated software.

Prior art systems that can function in an agentless manner include for example the systems Ansible (https://en.wikipedia.org/wiki/Ansible_(software)) and Nagios (https://en.wikipedia.org/wiki/Nagios) for system administration. These products however are primarily targeted at system administration and configuration functions and perform very little, if any, security functionality. These systems may help with patch management, user management, and security compliance functions but are not designed to deal with deep analysis and investigation for malware.

There are also products that function in an agentless manner for some kinds of security such as OSSEC HIDS (https://en.wikipedia.org/wiki/OSSEC), TrendMicro (https://success.trendm icro.com/solution/1060889-advantages-and-limitations-of-agentless-integrity-monitoring), and Infocyte Hunt (US patent application No. 20160099960). However, these agentless solutions lack key features and functions that enable effective threat detection The OSSEC HIDS and TrendMicro solutions for instance primarily focus on gathering remote file cryptographic hashes to detect changes or known malware. These products are not able to provide the wide scale analysis in detecting other more common signs of intrusion. They are also limited as they are not fully agentless. The primary functions of their operation require an agent to be loaded. Only a very small proportion of their security features can be run through agentless mechanisms. Furthermore, they operate by performing complete scans of the system which are very resource intensive while running.

The Infocyte Hunt product is described in US patent application No. 20160099960 by Gerritz et al. and describes a system that performs agentless memory imaging of the host computer that is then sent back to a remote computer system for analysis. The Infocyte Hunt platform does not provide on-host investigative capabilities to look for signs of compromise, tampering, and malicious activity in a targeted fashion. Additionally, the Gerritz et al. product requires significant time and resources to perform a memory imaging process and send the data for analysis. The resource demand will be high and the reduced performance capacity of the host computer is likely to be noticed by users.

Additionally, the Gerritz et al. product sends host-computer data for analysis to a backend system which can compromise the privacy and security of that host-computer data.

U.S. Pat. No. 9,088,606 by Ranum et al. uses an agentless approach to look again for cryptographic hashes of known malware on a host computer either on the file system or in memory. This approach has a significant drawback in that the Ranum et al. system cannot find unknown malicious processes or files on the host computer that it is not already aware of in its hash database. Furthermore, the Ranum et al. system is also not able to spot generic signs of compromise. Finally, any kind of mass checking for cryptographic hashes is naturally going to be resource intensive and noticeable to end users.

One problem with many prior art security systems is that the presence of local software or an agent on the host computer provides information to an intruder about the security of the system and provides an avenue for the intruder to circumvent that security by disabling the agent or local software or analysing it to determine when security scans are scheduled and running outside the schedule times while hiding or removing themselves during scheduled scans.

Most pre-existing local systems aim to provide (with respect to the time domain), a contiguous threat defence scheduled at regular intervals, which, while potentially comprehensive, applies a significant performance burden on the hardware and provides a clear and easily detectable target and time for an intruder to circumvent.

Similarly, prior art agentless security systems either run on a schedule or on demand and use contiguous scanning and thus become predictable for the intruder and enable the intruder to 'hide' any evidence while the system is scanning and then become active when the security system is dormant or otherwise inactive.

Contiguous scanning such as in the prior art is convenient for the operator as they can simply schedule a scan, normally at a time when system load is presumed to be low. However, as described previously, contiguous scanning presents a relatively high performance load for the host computer and provides increased likelihood that an intruder may avoid detection by removing evidence prior to a scan.

It would therefore be advantageous to provide an effective and efficient investigation system for investigating a host computer for malware, intrusion and/or other problems while minimising the performance and data load on the host computer and/or a communication network to which the host computer is connected.

It would also be advantageous to provide an investigation system that reduces the possibility of an intruder evading detection by the investigation system.

It is also an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process. Further aspects and advantages of the present invention will become apparent from the ensuing description which is given by way of example only.

SUMMARY OF THE INVENTION

Reference throughout the specification is made to the invention as relating to software, methods and systems for investigating unauthorised intrusion or malware on remote servers, although this should not be seen as limiting and the principles of the present invention may be applied to any computer system or computing device, including mobile devices and may be utilised for other computing applications.

To aid brevity and clarity, reference herein will be made to hardware devices in the singular, however, such reference should be interpreted to also include multiple components forming the device and/or multiple devices sharing the function, e.g. reference herein to a "server" should be interpreted to include multiple servers, distributed servers, cloud-based servers and the like.

As used herein the term "software" refers to one or more computer programs.

As used herein the term "program" or "computer program" refers to computer readable instructions ("code") operable to provide input to a computer processor to provide output to instruct the computer to perform one or more functions. The computer program may include code in one or more programming languages or may include machine code and the form of code should not be considered to be limited.

Reference throughout this specification to the singular should be interpreted to include the plural and vice versa unless specifically stated otherwise.

Hereon, the terms "scan" and "investigate" with reference to a host computer may be used interchangeably to refer to the process of investigating a host computer.

As used herein, the term "remote" with respect to a given host computer should not be interpreted to mean geographically or physically remote but rather where the given host computer receives data and/or instructions by components of the investigation system that operate on a different server, computer or CPU to the given host computer or with distributed terminals, processors, software and memory resources.

As used herein, the term "intruder" refers to an unauthorised entity, system or device that attempts to, or succeeds in, accessing resources of a host computer, the resources including data, programs, applications, processor calculations, memory or any other resource of the host computer.

The term "software agent" as used herein, refers to a computer program that resides on a host computer and is executable to operate specifically for another given computer program or data such that the software agent is required to be present for the given computer program or data to instruct the host computer to perform operations and the software agent is unable to perform those operations without the computer program or data.

In contrast, computer programs are not considered software agents if they are capable of being executed by the host computer to perform various operations that are not specifically and directly related to the given computer program or data.

Thus, the term "agentless" refers to the nature of a computer program that may run on a host computer without requiring a software agent on that host computer.

As noted above, it should be appreciated that a given computer program may still be considered "agentless" despite utilising computer software on the host-computer if that computer software is not provided specifically to directly operate the given computer program. By way of example, the host computer may run an operating system with various general computer programs installed, e.g. Python, that may be used to run any Python code, including for example the agentless computer program being provided as Python code. In contrast, methods that require software agents on the remote host computer such as Cylance™ (https://www.cylance.com), CarbonBlack™ (https://www.carbonblack.com/), CrowdStrike™ (https://www.crowdstrike.com/), Tanium™ (https://www.tanium.com/).

As used herein, the terms "execute" and "run", "executing" and "running", "execution" and "running" are used interchangeably and should be interpreted to be equivalents.

As used herein, the term "data network" should be understood to refer to any electronic network having a control system capable of receiving and transmitting data from connected computer terminals. A data network may thus be considered to include virtual private networks (VPN), the internet, telephone/cellular networks, local area (LAN), wide area (WAN), wireless, WIFI, satellite, radio, UHF, VHF, infrared, mesh networks, Bluetooth, ZigBee or any other network having one or more control systems and connected terminals.

As used herein, the term "non-contiguous" with respect to the running of multiple investigative modules should be understood to refer, with respect to the time domain, to running the investigative modules in an independent or separate manner to each other in contrast to a "contiguous" running of multiple investigative modules involving running all investigative modules together or sequentially without significant or discernible delay.

According to a first aspect of the present invention there is provided a method of investigating a host computer by using an investigation system, the investigation system including a computer system with a computer processor coupled to a system memory and programmed with computer readable instructions, the method including;
 a) establishing a connection with the host computer, and
 b) sending at least one investigative module to the host computer, the at least one investigative module configured to run on the host computer to perform at least one investigative function on the host computer.

According to another aspect of the present invention there is provided an investigation system for investigating a host computer, the investigation system including a database and a computer system with a computer processor coupled to a system memory and programmed with computer readable instructions executable to perform the following procedures;
 a) establish a connection with the host computer, and
 b) send at least one investigative module to the host computer, the at least one investigative module configured to run on the host computer to perform at least one investigative function on the host computer.

Optionally, the investigation system is agentless, the at least one investigative module not requiring a software agent on the host computer to run.

Optionally, the host computer is remote to the investigation system.

An investigative module may take different forms, either a computer program executable by the host computer or data that may be utilised by a computer program.

Thus, in one embodiment the at least one investigative module includes a computer program configured to run on the host computer using software that is non-specific to the investigative module.

In another embodiment, the at least one investigative module includes data utilizable by a computer program configured to run on the host computer using software that is non-specific to the investigative module.

It should be appreciated that the investigation system may have typical computing resources for deploying and executing software such as system memory, processors, storage memory (disk), network infrastructure and other hardware and software. It should be appreciated that these computing resources need not be in the same location, e.g. the investigation system may be a virtual system using 'cloud-computing' resources with distributed terminals, processors, software and memory resources.

Optionally, an investigative module is configured to perform a singular investigative function.

Optionally, the investigation system is configured to send at least one investigative module selected from a plurality of investigative modules collectively forming an investigative module library. The investigative module library optionally includes a database in one or more data stores, the database including one or more related or unrelated records including data relating to the investigative modules. The library may include the investigative modules within records or may provide links in the records to a data store location containing the investigative modules.

Optionally, the investigative module library includes at least one investigative module configured to perform a singular investigative function.

Optionally, the investigative module library includes at least one investigative module of less than 100 KiloBytes and preferably of less than 10 KiloBytes.

Optionally, the majority of the investigative modules are small in size, i.e. less than 100 KiloBytes and preferably less than 10 KiloBytes.

The at least one investigative module may be configured to run on the host computer independently from the investigation system.

The investigation system may be configured to send multiple investigative modules to the host computer. The multiple investigative modules may be sent together in single or multiple sessions, streamed, as a single data transfer or separately in multiple data transfers.

Optionally, multiple investigative modules may be sent, and the investigative modules configured to run on the host computer simultaneously, sequentially or according to a predetermined scheme. The scheme may be randomised to be unpredictable.

Reference herein to the term "unpredictable" with respect to a time schedule or selection should be understood to include random and pseudo-random times or time-ranges or any predetermined non-random selection that aims to prevent or at least hinder another system or entity from knowing with certainty the time that the at least one investigative module will be sent and/or run on the host computer.

Optionally, the investigation system is configured such that the at least one investigative module is run according to an unpredictable time schedule. This may be achieved in a number of ways, for example:
 sending investigative modules to the host computer according to an unpredictable time schedule;
 by configuring investigative modules to execute according to an unpredictable time schedule, e.g. an investigative module may be configured to self-execute after a randomised time delay after sending;

by configuring investigative modules to self-execute to perform their investigative function upon detection of an unpredictable trigger, e.g. system entropy level, unpredictable level of network data received and/or sent; unpredictable time, network, CPU, GPU, Disk or Memory load, memory load or other system parameter;

by establishing connections to the host computer according to an unpredictable time schedule;

combinations and permutations of the aforementioned.

Optionally, the investigation system is configured to generate an unpredictable time schedule, the unpredictable time schedule including a randomly generated execution time for each investigative module, or group thereof.

Optionally, the randomly generated execution time is sent to the remote host computer as computer readable instructions or data instructing the remote host computer to run the corresponding investigative module, or group thereof.

Optionally, the investigation system is configured to send the at least one investigative module, or group thereof, to the remote host computer at the execution time.

The unpredictable time schedule may include a time window within which the execution time is specified. Multiple time windows may be provided with corresponding execution times within each window to provide a repeating schedule by which the at least one investigative module may be executed repeatedly.

The execution time or time window may be modified unpredictably (e.g. manually, pseudo-randomly or randomly) to provide the unpredictable time schedule.

In one embodiment, additional parameters may be incorporated in a randomiser calculation to determine the execution time and/or time window for running the at least one investigative module. The additional parameters may include:

performance parameters of the host computer or investigation system e.g. processor, memory or network usage;

system entropy;

external randomiser variable, e.g. atmospheric noise or other randomiser variables;

combinations of the aforementioned;

Any other variable

Optionally, the investigation system is configured to send an unpredictable selection of investigative modules, such as selected from the investigative module library.

Reference herein to the term "unpredictable" with respect to the selection of investigative modules should be understood to include random and pseudo-random selections or any predetermined non-random selection that aims to prevent or at least hinder another system or entity from knowing with certainty which investigative modules will be sent and/or run on the host computer. This unpredictable selection may be achieved in a number of ways, for example:

selecting one or more investigative modules at random using a randomiser function;

including a random selection condition in each investigative module which determines if the investigative module is selected, the selection condition may be based on a system parameter such as: the system entropy level, level of network data received and/or sent; time, network, CPU, GPU, Disk or Memory load, memory load or other system parameter;

including a random selection condition in each investigative module which determines if the investigative module is selected, the selection condition may be based on other system parameters such as geographic or network location, host tags;

external randomiser variable, e.g. atmospheric noise or other randomiser variables.

combinations of the aforementioned;

any other unpredictable technique.

In one embodiment, at least one investigative module is configured to include an internal time schedule indicating a time(s) to be run on the host computer after being sent.

Optionally, the investigation system is configured to provide an unpredictable selection of investigative modules to send to the host computer and/or to be run on the host computer.

Optionally, the investigation system is configured to generate or receive a specification of a percentage value indicating a proportion of the selected investigative modules to run.

In another embodiment, the investigation system is configured to generate or receive a specification of a percentage value indicating a proportion of all available investigative modules to run.

Optionally, the investigation system may include a scheduler that may modify parameters to provide an unpredictable schedule of investigative modules to be sent to and/or run on the host computer, the parameters including:

a time window and/or execution time in which to send and/or run the at least one investigative module;

a selection of investigative modules to run;

a percentage value indicating a proportion of investigative modules to run.

The investigation system is thus configured to perform a non-contiguous investigation by running the investigative modules non-contiguously, i.e. not all of the investigative modules available are sent and used to scan the host computer together as is common for prior art systems, instead the investigative modules may operate independently and are sent individually or in groups as a result of the aforementioned scheduling.

The non-contiguous investigation thus hinders or counteracts the ability for an intruder to detect the presence of the investigative modules and/or to predict what modules are run and when.

The investigation system optionally includes at least one control server and at least one scanning node. The at least one scanning node optionally establishes the connection to the host computer and is connectable to the control server. The scanning node may be a computer server.

The scanning node and control server may use asymmetrical cryptography to store login credentials for the host computer, the scanning node holding a private key and the control server holding a public key. The control server optionally receives and then encrypts login credentials for the host computer using the public key and provides the encrypted login credentials to the scanning node for decryption to establish a connection to the host computer.

Optionally, the control server includes the scheduler, defining timing and the investigative modules to be sent to the host computer.

Optionally, each investigative module may perform one or more investigative functions on the host computer to investigate the host computer to ascertain if the host computer has any data or process (hereinafter collectively referred to as data forms) with suspicious attributes.

Optionally, the data forms includes any data or software, process, manipulation, transmission, operation, deletion or part thereof associated with the host computer, including active, dynamic or static data or processes.

Data form attributes may for example include name, directory, location, size, function, origin, history, activity, execution time, duration, throughput, privilege, or indeed any other attribute of a data or process.

Optionally, the host computer is deemed to be in an unsuspicious state when all the host computer data form attributes comply with corresponding predefined integrity status.

Optionally, a data form is considered suspicious when at least one data form attribute differs from the predefined integrity status.

The predefined integrity status may be defined in a variety of ways, according to the preferences of the user, convenience, external or internal security or technical standards, historical benchmarks or comparisons, or any other chosen criteria. As an example, in its simplest form, the host computer may be considered to be in an unsuspicious state when part, or all of, the data form attributes match those of a previous instance (ideally corresponding to a previous successful investigation) i.e. the host computer appears unchanged.

More specifically, the following list details various data forms of the host computer that may be investigated and examples of suspicious conditions for each data form. The exemplary data forms that are listed below that may be investigated are includes under the broad categories of "File", "Process", "User", "Log", "Directory", "Reconnaissance" and "Incident Response".

File Data Forms

"File" Investigative modules may perform the investigative function of investigating the host computer to ascertain if there are any files stored on the host computer (or stored separately but accessible by the host computer) and that have attributes differing from a predefined integrity status.

To make such an investigation the investigative module may generate a cryptographic hash of one or more directories on the host computer and compare with generated cryptographic hashes of other directories, the comparison indicating whether the condition is deemed suspicious or not.

Example suspicious file data form attributes are listed below and include:
- i. Illegitimate files, being files, system shells or other data with deliberately misleading attributes, designations or characteristics to conceal their true function, location or purpose, e.g. system files in non-standard system locations or files that do not appear to be part of the standard system install but are installed as if they are or files disguised as a different file type, e.g. a packet sniffer renamed so it is not easily identified.
- ii. Files known to be suspicious or malicious files.
- iii. Files that can provide escalated privilege or other malicious features.
- iv. Renamed system shells e.g. system shells that have been renamed to conceal their true functionality such as /bin/false or /sbin/nologin that are really system login shells
- v. Files with attributes matching something they are not such as HTML files that are executable code.
- vi. Files that contain malicious or suspicious payloads such as backdoors and other dangerous operations.
- vii. Files with very high entropy indicating they are compressed or encrypted to prevent analysis.
- viii. Files with unusual attributes set such as being immutable to prevent deletion.

Process Data Forms

Process investigative modules may perform the investigative function of investigating the host computer to ascertain if there are any processes on the host computer that have data form attributes differing from a predefined integrity status.

To make such an investigation, the investigative module may generate a cryptographic hash of all the running processes on the host computer and make a comparison with process names or other process data form attributes, the comparison indicating whether the condition is deemed suspicious or not.

Example suspicious process data form attributes are listed below and include:
- i. Processes that are running but deleted from a storage memory of the host computer.
- ii. Processes that appear to be trying to avoid detection.
- iii. Processes that have open network sockets to act as a backdoor or server.
- iv. Processes that are running with a suspicious combination of features (such as a network sniffer).
- v. Processes running out of suspicious locations such as /tmp, /dev, or the root user home directory.
- vi. Processes with unexpected or suspicious names such as being called just one character, having spaces in unusual locations, or trying to look like or impersonate legitimate processes on the system in other ways.
- vii. Processes disguised as legitimate processes on the system.
- viii. Processes that may be interfacing with the kernel or operating system in suspicious ways to hide activity or otherwise perform illegitimate operations.
- ix. Various other ways that a process may be acting strangely to conceal its activity, presence or purpose.
- x. Processes running from hidden or suspicious directory names.
- xi. Processes running from directories from a currently unmounted file system.
- xii. Processes running from protected system directories that would not normally allow this kind of activity.
- xiii. Processes running with a binary that has high entropy indicating is compressed or encrypted to avoid analysis.
- xiv. Processes running on a host that have never been seen before.
- xv. Active anti-forensics and other anti-detection features and methods.

User Data Forms

User investigative modules may perform the investigative function of investigating the host computer to ascertain if there are any users or user accounts on the host computer that have data form attributes differing from a predefined integrity status.

Example suspicious user data form attributes are listed below and include:
- i. Users belonging to the root user ID group but are not named root.
- ii. Users trying to conceal their activity by deleting or linking their command histories to locations such as /dev/null or similar.
- iii. Users trying to conceal their presence by deleting themselves from system /etc/passwd files but still remaining in a local password database.
- iv. Users making their home directory /dev/null to conceal activity.
- v. Suspiciously added users trying to masquerade as legitimate system default accounts.

vi. Unusual login patterns and behaviour for users.
vii. Suspicious login times, locations, or concurrent logins from a combination thereof.
viii. Authentication tokens that can allow users to login when a casual review would make it seem like they cannot (e.g. orphaned or malicious SSH authentication keys.)

Directory Data Forms

Directory investigative modules may perform the investigative function of investigating the host computer to ascertain if there are any directories on the host computer that have data form attributes differing from a predefined integrity status.

Example suspicious directory data form attributes are listed below and include:

i. Illegitimate directories, being directories with deliberately misleading data form attributes, designations or characteristics to conceal their true function, location or purpose, e.g. a directory named as a standard system directory but having different case values set (e.g. /etc vs. /Etc).
ii. Hidden directories under system areas or otherwise incorrect locations, e.g. under such as /bin, /sbin, etc.
iii. Suspiciously named directories, e.g. naming a directory " . . . " or ".." (dot dot space) can look legitimate to an admin quickly doing a directory listing but are often malicious.
iv. Directories that have an invalid link count. This may be achieved by stealth rootkits that have modified the kernel runtime to not show certain named directories, but are not able to modify the actual filesystem to change link structure
v. Other directories of known malware, rootkits, or other signs of compromise that indicate something malicious.
vi. Unusual directory activity in system locations or otherwise incorrect locations.
vii. Unusual directory activity under system or user account locations.
viii. Directories from a previously mounted file system that has had a legitimate file system mounted on top of to conceal its location/presence.
ix. Directories that have unusual directory attributes such as being set as immutable.

Log Data Forms

Log investigative modules may perform the investigative function of investigating the host computer to ascertain if there are any logs on the host computer that have data form attributes differing from a predefined integrity status.

Example suspicious log data form attributes are listed below and include:

i. log file tampering, inconsistencies, or other signs that audit logs have been tampered with or disabled on the host computer.
ii. Audit logs such as wtmp, utmp, btmp, or lastlog that have been zeroed out or erased.
iii. Audit logs such as wtmp, utmp, btmp, or lastlog that have been edited to remove entries.
iv. log file tampering e.g. deleted or zeroed out legitimate system logs that track system messages, audit information, or other log activity.
v. Inconsistent log file tampering that may have modified one kind of audit log such as wtmp, utmp, or btmp, but did not modify other logs that can be used to cross correlate and show tampering took place.
vi. Injection of false, misleading, or inconsistent information into system logs to avoid detection or to appear as legitimate events.
vii. Other log file evasion, deletion, and editing to cover user or system misuse.

A further type of investigative module includes 'reconnaissance' investigative modules that investigate general information about the host computer be used by administrators to determine the state of the host computer. Reconnaissance investigative module functions include but are not limited to:

i. Gathering operating system and hardware information on the host computer. This includes operating system versions, patch levels, kernel versions, software loaded, etc.
ii. Gathering hardware information on the host computer such as CPU, hard disk, memory available, etc.
iii. Gathering network information on the host computer such as listening network ports, network activity, or active servers.
iv. Gathering user information on the host computer, such as logged in users, users with valid accounts, newly added users, default users, user directory information, etc.
v. Gathering process information on the host computer, such as all running process IDs, process names, CPU usage, memory consumption, process types, process files open, disk activity, scheduled tasks, etc.
vi. Gathering log data on the remote system, such as audit logs, kernel logs, process logs, and other relevant data.
vii. Gathering all open files for running processes.
viii. Gathering all cryptographic hashes of running processes.
ix. Gathering all open network ports for all processes and users.
x. Gathering all in use network ports and the remote system connected to.
xi. Process tree information which includes full process details such as parent and child processes, binary locations, hashes, directories, effective user ID, memory, CPU and network usage.
xii. All logged in users.
xiii. All firewall rules.
xiv. All routing information
xv. All logins recorded by the system including remote host information for the connection and user IDs.
xvi. All bad logins recorded by the system including remote host information and failed user ID used for the login attempts.
xvii. Gathering all open files, named pipes, and other associated information with all running processes.
xviii. Gathering memory and kernel structures to search for malicious hooks and other malicious activity.
xix. All scheduled tasks (e.g. crontab and system scheduled tasks).

A further type of investigative module includes 'incident Response (IR)' investigative modules that may investigate the host computer to perform deep investigative analysis or collection of data. Incident Response (IR) investigative modules functions include, but are not limited to:

i. Detecting listening network servers and services, e.g. by gathering all open network ports by direct query.
ii. Collecting log data to save for forensic analysis and prevent tampering on the host.
iii. Collecting data including active and inactive users on the host computer as well as their activity on the host computer.
iv. Detailed hard drive inspection for suspicious directories, files, and processes.

v. Collecting a full file system cryptographic profile to spot malicious files across other systems.
vi. Collecting memory snapshots to isolate and analyse actively running malicious programs that are on the system.
vii. Retrieving kernel modules status, process table status, file system data form attributes for all system volumes.
viii. Searching for hidden network capture files, hidden binaries, encrypted files and other similar signs of compromise activity.
ix. Any of the previous investigative module types but modified to do deeper and broader searches for problems and return data so a human operator can analyse the data to identify problems.
x. Initiating reactive countermeasures.

Optionally, at least one investigative module is configured to be inoperable when sent to the host computer. The inoperable investigative module may thereby act as a 'decoy' for an intruder who may use time and/or resources attempt to stop, remove or otherwise hinder the investigative module. The term "inoperable" as used herein should be understood to include computer programs that are unable to execute, are executable but perform no operations on the computer or are executable to perform an operation that isn't functional to alter the state of the host computer or data thereon.

An intruder may attempt to identify, analyse or otherwise interfere with the investigative modules and a number of techniques may be implemented by the present invention to mitigate such attempts. These techniques may include one or more of:

At least one of the investigative modules may be configured to run on the host computer and then be removed from the host computer. Optionally, at least one of the investigative modules may be configured to self-delete after completion. Alternatively, or in addition, at least one of the investigative modules may be configured to remove another investigative module on the host computer.

At least one investigative module may be a computer program with code that is configured to decrypt, decompress and run on the host computer, subsequently self-deleting when finished running.

At least one investigative module may be encrypted with a disposable key. A scanning node may generate an encryption key and encrypt the investigative module upon sending to the host computer. The host computer may decrypt the investigative module and delete the key once the investigative module has run, thereby preventing subsequent decryption of the investigative module e.g. by an intruder attempting to analyse the investigative module.

At least one investigative module may be a computer program with code that is obfuscated.

At least one investigative module may be a computer program with code that is compressed.

The method of any one of the preceding claims, wherein the at least one investigative module is configured to generate investigation data including results of the investigative function performed by the at least one investigative module.

Security of data returned by the investigative modules may also be important and it may be necessary to prevent confidential data from being transmitted from the host computer. Many operators may prefer to receive the results of the investigation and perform further investigation and/or remedial action without involvement of an external entity who would otherwise have access to potentially sensitive or confidential data.

Optionally, at least one investigative module is configured provide the investigation data to the host computer, e.g. writing to an electronic on the host computer or sending data to a UI on the host computer.

In one embodiment, the investigative modules may be configured to send data to a machine learning sub-system on the host computer and/or the investigation system to assist in automatically identifying problems.

Optionally, the at least one investigative module is configured to generate alert data and send the alert data to the investigation system if it is stopped, removed prematurely or returns investigation data of unexpected data type or content.

Optionally, at least one investigative module is a computer program configured to not transmit data retrieved from the host computer to the investigation system. The investigative modules are optionally configured to return data retrieved from the host computer to an electronic file on the host computer.

In one embodiment at least one investigative module is a computer program that may return the results of the investigative function to the investigation system without providing data retrieved from the host computer.

Optionally, at least one of the investigative modules is configured to request additional investigative modules be sent to the host computer, for example, an initial file scanning investigative module may be sent to perform a first scan of the file system and then if any potential threats are identified, the initial scanning investigative module may transmit data to the investigation system indicating a request that one or more additional investigative modules be sent that may perform additional tasks.

The performance load on the host computer may thus be minimised by only receiving and running those modules that are required, in contrast to prior art local or agent-based systems that attempt a contiguous investigation or real-time threat defence with a correspondingly high-performance load on the host computer.

Thus, according to another aspect of the present invention there is provided a method of minimising the performance load incurred by an investigation of the host computer using an investigation system as aforementioned, the method including investigating the host computer using a discontiguous process of running investigative modules.

In some applications the host computer may be formed from a 'container' or include one or more containers running thereon.

As used herein, the term "container" refers to a stand-alone, executable package of a piece of software that includes everything needed to run it: code, runtime, system tools, system libraries, settings etc. Containers aim to isolate the software from the surrounding operating system so as to be able to run application processes within the container as if the containerised applications were operating on their own separate system In one embodiment, the container may be at rest, (e.g. with no processes running) or active—with processes running.

Optionally, results of at least one investigative module's investigation on the host computer are sent to the control server as investigation data.

Optionally, the investigation data, indicating results of at least one investigative module's investigation on the host computer are sent to the control server via the scanning node.

Optionally, the control server is configured to enable a user to connect to the control server and request an investigation of a host computer, the user providing login credentials to the control server and a request to perform the investigation.

Optionally, the scanning node is configured to deny access to the user if the host computer is connected to the scanning node.

Optionally, the login credentials for the host computer are stored temporarily in the scanning node to establish the connection to the host computer and persists only until the connection is terminated. Optionally the login credentials for the host computer are stored in volatile memory of the scanning node, e.g. the scanning node Random Access Memory (RAM). Thus, if a scanning node is compromised and a non-volatile memory store is copied the login credentials are still inaccessible.

The control server optionally includes, or has access to, a database for storing data such as, data form attributes of the host computer, users and scanning nodes, investigative modules, results from the investigative modules and other data.

Optionally, at least one investigative module is configured to scan the host computer for containers, the investigative module returning a list of containers to the scanning node. The scanning node may then send at least one investigative module to the host computer, the investigative module configured to attach to, and investigate one of the containers.

The at least one scanning node optionally includes decryption keys for encrypted investigative modules and provides the decryption keys to the encrypted investigative modules for decryption when a connection to the host computer is established and the encrypted investigative modules have been sent to the host computer.

Therefore, it can be seen that embodiments of the present invention offer significant advantages over the prior art including providing a method and system for investigating a host computer that is capable of at least one of:
- investigating a remote host computer without a software agent;
- investigating a remote host computer with reduced system impact relative to prior art systems;
- investigating a remote host computer without transmitting confidential data from the host computer;
- investigating a remote host computer without requiring a malware signature database;
- providing a flexible, targeted and easily updated investigation system;
- investigating many types of host computers, including servers, computers, mobile computing devices, Internet Of Things (IOT) devices and other computers
- more effective locating of malware that runs temporarily on the host computer;
- investigating containers and/or containerized applications on a host computer;
- making the host computer appear unprotected;

Reference herein is made to various aspects and embodiments of the present invention. For clarity, and to aid prolixity, every possible combination, iteration or permutation of features, aspects and embodiments have not been described explicitly. However, it should be appreciated that the disclosure herein should be interpreted to include any combination, iteration or permutation unless explicitly and specifically excluded.

BRIEF DESCRIPTION OF THE DRAWINGS

Further aspects and advantages of the present invention will become apparent from the following description which is given by way of example only and with reference to the accompanying drawings in which.

DESCRIPTION OF THE PREFERRED EMBODIMENTS

Figure 1:
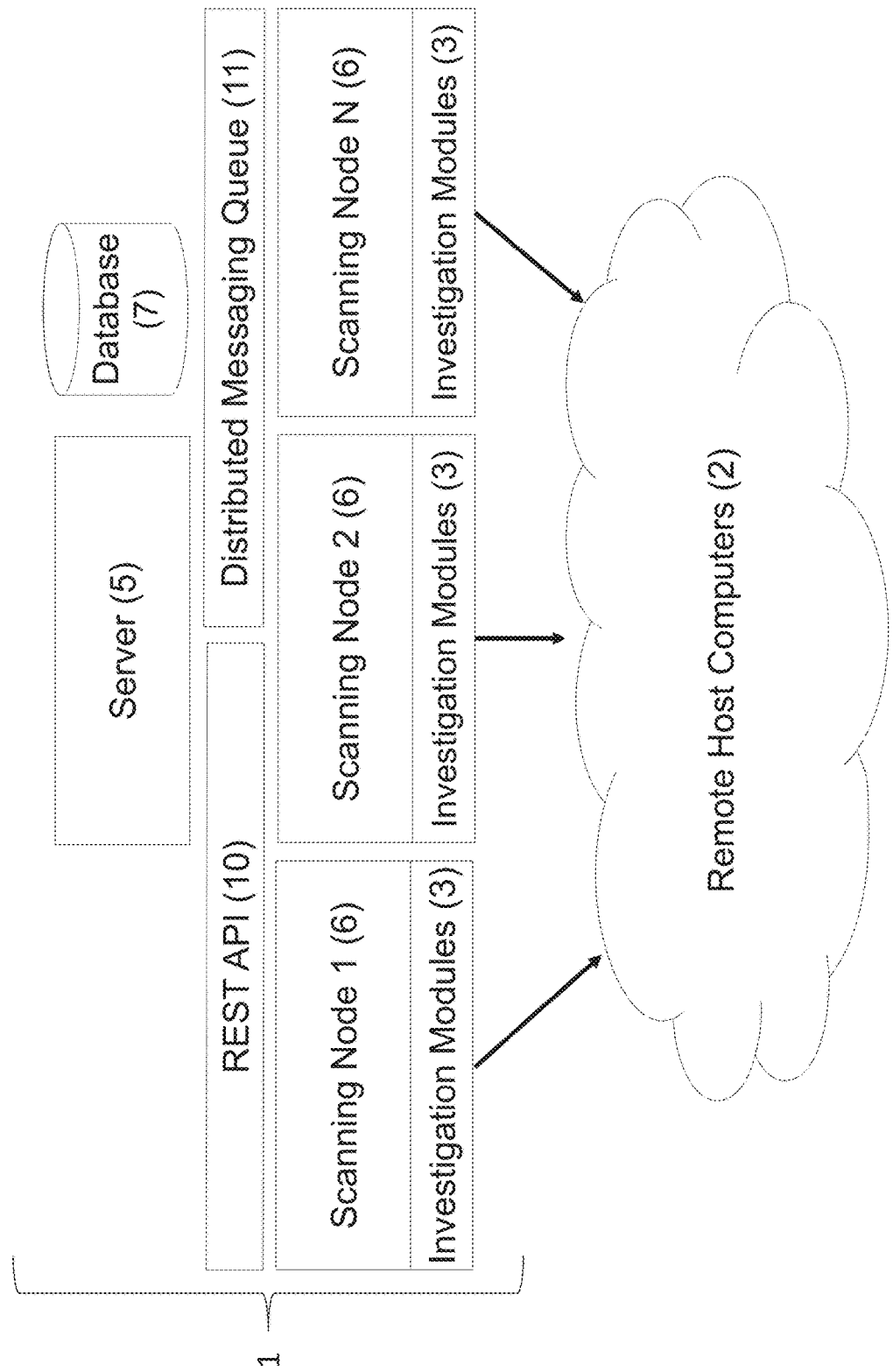
FIG. 1 shows a high-level schematic diagram of an investigation system according to one embodiment.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention covers alternatives, modifications, and equivalents which may be included within the spirit and scope of the present invention as described herein and as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Some portions of the descriptions in this document are presented in terms of procedures, logic blocks, processing, protocols and other symbolic representations of operations on data bits within a computer memory. These descriptions and representations are the means used by those skilled in the data processing arts to most effectively convey the substance of their work. In the present application, a procedure, logic block, process, function, or the like, is a self-consistent sequence of steps or instructions leading to a desired result. Reference herein will also be made to various "algorithms" which should be understood to refer to one or more computer-implemented processes, procedures, functions and/or calculations that are capable of accessing, reading, processing, modifying, creating or otherwise manipulating data.

The "steps" of each method are those requiring physical manipulations of physical quantities. Usually, although not necessarily, these quantities take the form of electrical or magnetic signals capable of being stored, transferred, transmitted, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analysing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "filtering," "flipping," "generating," "grouping," "hiding," "identifying," "initiating," "investigating," "interacting," "modifying," "monitoring," "moving," "outputting," "performing," "placing," "positioning," "presenting," "processing," "programming," "querying," "receiving," "running", "removing," "repeating," "resuming," "sampling," "scanning," "selecting," "sending," "simulating," "sorting," "storing," "subtracting," "suspending," "tracking," "transcoding," "transforming," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
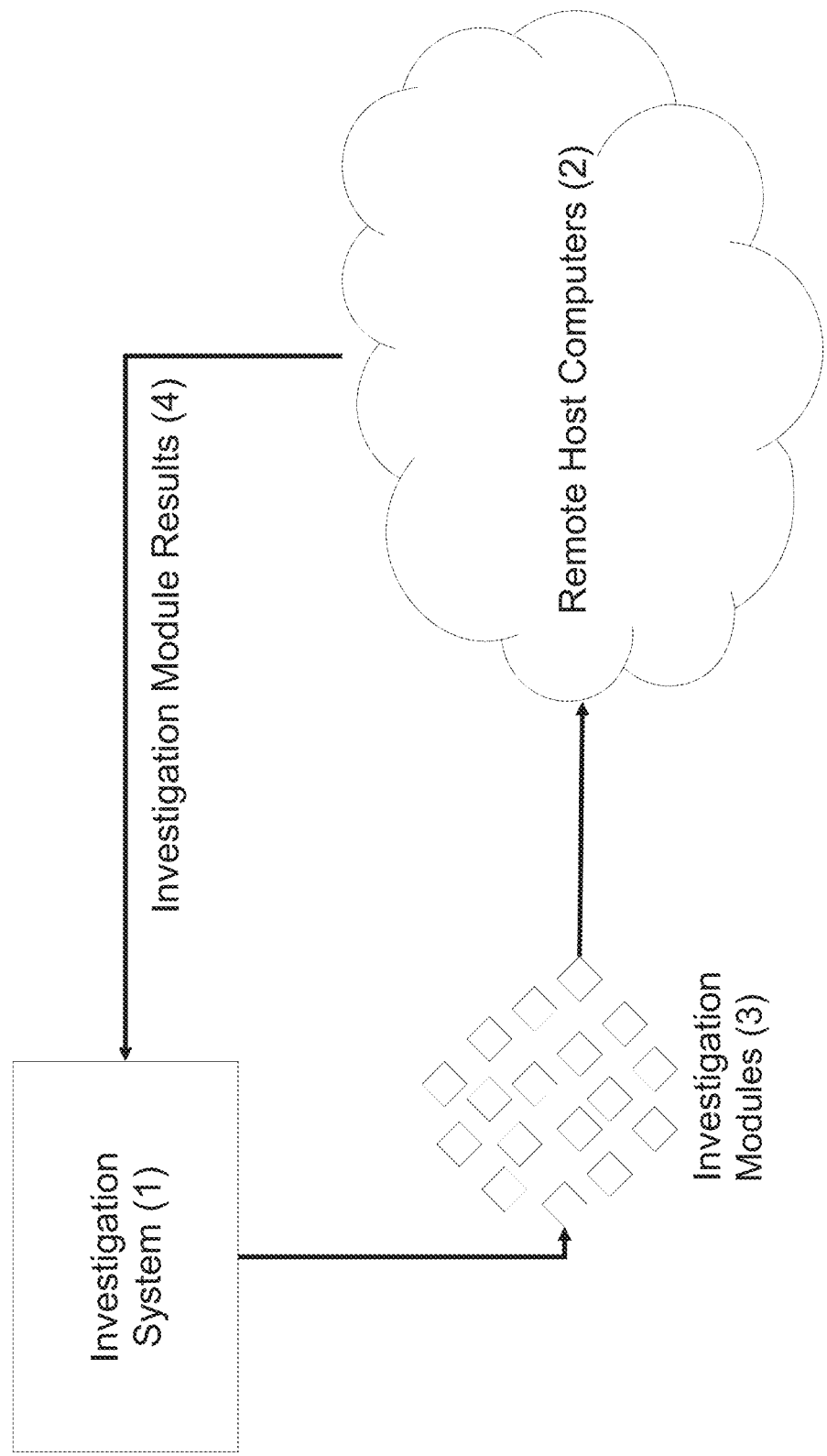
FIG. 2 shows a high-level schematic diagram of a method of investigating host computers using the investigation system of FIG. 1.

Described herein and as shown in the figures is an "investigation system" 1 1. FIGS. 1 and 2 show high-level schematic diagrams of the investigation system 1 1 in operation with remote host computers 2.

As used herein, the "user" may refer to any user of the system, including operators of investigation system 1 or other entities requesting use of the investigation system 1.

The investigation system 1 is herein described as investigating host computers 2 such as Linux based computer systems including servers, workstations, and Internet of Things (IoT) devices as well as cloud infrastructure and containerized applications. However, this should not be seen to limiting as the investigation system 1 can also be adapted to investigate other types of host computer 2.

The investigation system 1 uses discrete investigative modules 3. Investigative modules 3 are computer programs constructed from small pieces of code, thereby being small in data size and easier to modify than computer programs written with a relatively large amount of code.

The investigative modules 3 are sent to and executed on the host computer 2. Each investigative module 3 performs one or more investigative functions and collectively the investigative modules 3 may perform a wide variety of investigative functions.

The investigative functions are designed to investigate the host computer to ascertain if the host computer has any data or process (hereinafter collectively referred to as data forms) with suspicious data form attributes. The data forms include any data or software, process, manipulation, transmission, operation, deletion or part thereof associated with the host computer, including active, dynamic or static data or processes.

The host computer 2 is deemed to be in an unsuspicious state when all the host computer data form attributes comply with corresponding predefined integrity status.

Axiomatically, a data form may thus be considered suspicious when at least one data form attribute differs from the predefined integrity status.

The investigation system 1 may thus perform the same or greater number of investigative functions as a comparable system having extensive functionality but written as large computer programs, i.e. the investigation system 1 can be considered to be operating in a relatively fragmentary manner.

The investigative modules 3 are sent to the host computer 2 and run on the host computer to investigate the host computer 2 to determine if the host computer 2 has been compromised in some way, e.g. if malware or an intruder is present. The investigative modules 3 may then optionally send the investigation results 4 back to the investigation system 1 for further review and analysis.

The investigation system 1 in this embodiment requires the following on a host computer 2:
1) Secure Shell (SSH).
2) Python language interpreter.
3) A Unix command shell if Python is not available.

SSH is used to securely connect to the host computer 2 over an encrypted channel. SSH is an industry standard security protocol used to access computer systems. SSH is present on almost all network connected infrastructure hosts by default.

Python is one of the world's most commonly deployed software languages. Like SSH, it is typically loaded on Linux and other systems by default.

If Python is not available, the system is capable of performing many of the operations described using Unix shell scripting as a shim which collects relevant data which is then analysed by the backend server with a rules engine.

By using SSH, Python or a Unix shell, the investigation system can function on a large variety of host computer types without any kind of modification or software agent install on the host computer 2. Thus, the agentless nature of the investigation system 1 enables it to be deployed for work immediately (without requiring software agent install) even on host computers 2 that have never had any kind of security monitoring. All the host computer 2 needs is SSH Python or a Unix shell which are present on many devices as part of their default software packages.

FIG. 1 shows a high-level schematic diagram of an exemplary investigation system 1 structure and includes a control server 5 and scanning nodes 6 both formed by computer servers with server processor, memory and other typical server computing resources. The control server 5 stores or has access to a database 7 7. The scanning node 6 is typically another server.

There may be many scanning nodes forming part of the investigation system.

A more detailed description of the investigation system 1 is now described. Broadly, the investigation system 1 can be deemed to be formed from three main components:
Control Server 5
Scanning Nodes 6
investigative modules 3

The server 5 is responsible for interacting with users over a web interface communicating to a REpresentational State Transfer (REST) API 10. The server 5 also interacts with a backend database 7 7 (in this described embodiment Elasticsearch™ is used, but the system is database agnostic). The server 5 also acts as the communication API for scanning nodes 6 to receive orders for scans and pass back results.

The scanning nodes 6 communicate with the server 1 over a distributed messaging queue protocol 11 such as AMQP. The type of protocol is not typically important as it is predominantly used as a tunnel to send scanning order manifests to be run against host computers 2. Order manifests are detailed lists of what host computer 2 to scan, investigative modules 3 to use for the scan, and encrypted login credentials. The scanning node 6 receives these manifests, performs the requested scan, and returns the results back to the server 5 over a REST API 10.

Investigative modules 3 are the computer programs (comprising pieces of code) pushed to remote host computers 2 to perform a variety of tasks such as security checks and remediation. Investigative modules 3 in this embodiment are small pieces of Python code that each have a singular task. As the investigative modules 3 each have a singular function they have a minimal data size and can be transmitted across the network easily.

Once the investigative modules 3 arrive on the host computer 2, they are executed and return their results. While Python is being used now due to the wide deployment on Linux, in the future other languages like Go, Java, or C could be used. An investigative module 3 can be written in any language if the host computer 2 supports it. A further embodiment uses Unix shell scripting if Python is not available and no other options are present. This embodiment collects similar data and sends it to the backend server 5 for rule engine analysis.

The investigative modules 3 may collectively form a library of investigative modules 3 with users, administrators, scanning nodes 6 or the control server 5 selecting investigative modules 3 from the library to run on the host computer 2. The library of investigative modules 3 may be added to as new investigative modules 3 are created to perform new functions. An advantage of the investigation system 1 is that investigative modules 3 can be written quickly and deployed without needing to modify the host computers 2 and potentially without needing to modify the scanning nodes 6 or server 5.

Users can add new investigative modules 3 to the library and they are immediately ready for deployment. Unlike prior art systems that may require major updates to deliver upgraded security capabilities, new investigative modules 3 can be added without any modification to the investigation system 1 and can be deployed immediately.

The server 5 has a REST API interface 10 built to handle calls from a User Interface (UI) and scanning nodes 6. The UI provides a graphical front-end to the server 5 for ease of use. The REST API 10 can be called by anyone without a UI if it's required to incorporate the investigation system 1 into a larger existing product such as a Security Information Enterprise Management (SIEM) tool or other monitoring software.

The REST API 10 also allows scanning nodes 6 to authenticate and return data for protected systems.

The server 5 is responsible for the management of host computers, login credentials, and investigative modules 3. It is also responsible for scheduling and executing of scans, collecting results, reporting alerts, and displaying results to the user for analysis. The server 5 is also responsible for communicating scan requests to the scanning nodes 6 over the messaging queue 11.

The scanning nodes 6 are responsible for logging into host computers 2 to execute investigative modules 3 and report results 4. The scanning nodes 6 receive requests for scans (called orders or order manifests) from the server 5. Scanning nodes 6 also receive encrypted login credentials to use to scan the host computers 2. The scanning nodes 6 may run a multi-threaded module to rapidly scan network systems and report back findings.

Scanning nodes 6 are designed so that they can run on publicly visible computer systems, or on private internal networks. Data collected by the nodes 6 in any of these contexts can be sent back to the server 5 for analysis. In this way, the investigation system 1 can work comfortably not only on publicly facing services such as web servers, but also on private cloud or internal infrastructure without any modifications.

The investigation system 1 does not normally limit the number of scanning nodes 6 that may operate. Each scanning node 6 connects to the messaging queue 11 and can receive and process investigative module scan requests as required. The investigation system 1 can be scaled to handle very large networks across public or private networks. As scanning nodes 6 reach capacity, new scanning nodes 6 can be added to take on new workloads. When workloads decrease, scanning nodes 6 can then be taken offline without any impact to the operation of the investigation system 1.

As hereinbefore described, investigative modules 3 are small pieces of code designed to be pushed to host computers 2 to perform targeted security analysis and response. An advantage of the investigation system 1 is the depth and breadth of investigative module types that can be deployed along with the rapid development and deployment capability. Investigative modules 3 may be written to be generic in how they detect signs of compromise and highly focused on a singular or low number of investigative functions and so to be small and fast to prevent overwhelming network and computer resources.

In preferred embodiments at the time of writing, the average investigative module size is around 5-6 KiloBytes (KB) in size and about 20-30 lines of code. This means that many investigative modules 3 can be pushed to a host computer rapidly even on a modest network connection. The small size means that the investigative modules 3 are easier to write and debug as they are not trying to perform a great number of functions. Investigative modules 3 may be used to target particular problems or sent in random swarms to do a dragnet style search for incidents without overwhelming the network or host computer.

The use of Investigative modules 3 may aid in avoiding the large monolithic code problem prior art systems have whereby they try to scan for all problems at once with a very large and complicated codebase. Small investigative modules 3 offer advantages in that they simplify development, reduce code complexity, enable faster targeted response to threats, and allow the system to have a higher overall performance.

The Investigative modules 3 typically also do not rely upon static signatures such as "worm variant A" or "worm variant B" detection. Rather, the investigative modules 3 may detect generic signs that something is amiss. In this way the investigative modules 3 are able to spot signs of problems without knowing exactly what the name of the attack is or how the host computer 2 was compromised. This is important because it means the investigation system 1 is potentially able to spot common and uncommon compromises without needing an endless supply of updates as is common with prior art anti-virus and anti-malware products.

The investigative modules 3 are designed to take an analogous approach to that of a human forensic investigator for what they would search for on the host computer 2 to detect if something is wrong. A human investigator will normally look for general signs something is suspicious instead of trying to detect variant X, Y, or Z of a particular attack. The investigation system 1 may emulate this principle as well. Instead of trying to know the exact cause of a system compromise, the investigation system 1 may provide the user, administrator or investigator with data that, based on generic or targeted investigation concepts, the host computer is either compromised or not.

The investigative functions of some exemplary investigative modules 3 are included in Appendix A. The investigative modules listed are exemplary only and show functional descriptions of the various investigative modules 3. There may be numerous investigative module types that cover a wide range of investigative functions and a major benefit of preferred embodiments of the investigation system 1 is that new investigative modules 3 may be written and deployed without any modification or software installation on the host computer 2.

More detailed explanations of a selection of investigative modules 3 are now described below.

Masquerading Processes.

Some Investigation Modules 3 may search for illegitimate programs running processes appearing to be legitimate system processes. Often, such illegitimate processes will use names or other data form attributes identical to system processes to prevent an investigator or administrator from identifying them. Such programs have data form attributes (names or other attributes) differing from a predefined integrity status (identical to system processes) and are thus considered suspicious.

One method in which the Investigation Modules 3 may locate such illegitimate programs is by generating a cryptographic hash of every running process on the system and analyzing the list to identify identical process names where the cryptographic hashes do not match, i.e. the process condition is suspicious if processes with identical names in the system don't have identical cryptographic hashes. Thus, in this example, the predefined integrity status is complied with if the cryptographic hashes were identical and considered suspicious if the hashes differ.

For example, if you have two system processes that purport to be a webserver (e.g. "httpd"), then the cryptographic hashes should be identical when operating. However, if we discover that two programs named "httpd" have different cryptographic hashes then we can determine immediately that they are not in fact the same and one is impersonating the other.

When the process is ascertained as suspicious the Investigation Module 3 will flag both processes for investigation along with comprehensive forensic information in the form of data form attributes such as process names, process dates run, process owner, process locations, process files open, process network sockets open, process cryptographic hashes and similar.

Renamed Processes.

Some Investigation Modules 3 may search for renamed processes. Sometimes an attacker may modify a data form attribute such as the name of a legitimate program before starting it on the remote host computer. This can allow the attacker to use the program for a malicious activity while avoiding detection as the program is renamed and thus appears to be a different legitimate process. For instance, a system network utility that opens a network socket and attaches itself to a system shell as a backdoor is a legitimate program but may be used maliciously. Under this situation the attacker may want this activity to appear to be a legitimate webserver or other system daemon to prevent close inspection.

In order to locate a renamed process the Investigation Module 3 may build a list of all system processes that are running along with their hashes. Then retrieve identical system hashes that are also running and ensure they have the same program name. Any hash that is identical to another process, but has a different name, is deemed suspicious, i.e., differing from a predefined integrity status (of having identical hashes).

For example, an attacker can start the popular and common Secure Shell (sshd) daemon to use as a backdoor onto a host. Most systems have sshd running by default on TCP port 22 so this is not unusual. However, an attacker may start sshd and have it impersonate a HTTP server on port 80. The attacker can then connect to port 80 with their own credentials and get access to the system. However, for an administrator reviewing the system it may appear to be a webserver running on that port.

Masquerading Files.

'Masquerading' files are suspicious files used in a technique whereby an attacker modifies a data form attribute such as a file name by renaming a legitimate system program to give a misleading appearance on the file system. For instance, they may take a system shell and copy it to a new name and use that as part of a privilege escalation attack.

Prior art systems have difficulty in identifying if such behavior constitutes suspicious behavior (i.e. differing from a predefined integrity status) without doing an extensive cryptographic hashing of the remote host file system ahead of time. These predefined integrity status checks are slow and extremely CPU intensive. They also require storing cryptographic hashes to be used for comparison later. Further, they are prone to false alarms as systems are updated and new files are patched or introduced. Each time a new set of cryptographic hashes needs to be regenerated and if this is not done then false alarms or missing malicious activity is possible.

In contrast, some Investigation Modules 3 in the investigation system 1 may be written to generate system cryptographic hashes of system binaries before hunting for masquerading files.

In one embodiment an Investigation Module 3 may be configured to retrieve system binary directories such as /bin, /sbin, /usr/bin, /usr/sbin and generate a list of all binaries present and generate cryptographic hashes of each. The Investigation Module 3 may then search on the file system in key critical areas such as temporary and user directories for identical hashes having a different name.

For example, an attacker can copy the system shell "/bin/bash" to their home directory and rename it ".data" and give it permissions to run as an administrator (SUID root). When the attacker logs into the host, they can simply run the ".data" binary and get instant administrator access. The Investigation Module 3 may find this activity because it first generated hashes of all legitimate binaries and compared it against user home directory files to see if an identical hash was found but with a different name. In the above example, the Investigation Module 3 would ascertain that the file "/bin/bash" matches the malicious user's file ".data" and issue an alert with data relating to the file to assist an investigator.

The above Investigation Module 3 has advantages over prior art methods in that the hashes are generated on the fly and are not needed to be stored on a central server. The Investigation Module 3 may also be used regardless of whether or not the host computer has been previously investigated. Furthermore, the targeted approach is relatively fast as the Investigation Module 3 performs the investigation for key system areas and doesn't expire because in each execution a fresh list of binary signatures is generated.

Cloaked Stealth Rootkit

Stealth rootkits on the Linux platform generally operate as what we call Loadable Kernel Modules (LKM). An LKM rootkit is able to intercept system calls to hide its presence and activity. For instance, the rootkit can intercept system file read operations so when an attempt is made to look into key system configuration files the rootkit can hide flagged lines from operation. In one method, an LKM rootkit may hide its start-up mechanism in this way so investigators cannot see how the rootkit initializes itself when the system starts. Once a system boots, the LKM rootkit ensures investigators are unable to see this information to remove it and prevent it from restarting.

LKM rootkits typically intercept system calls using standard file read/write operations or directory read/write operations.

An Investigation Module 3 may be included in the investigation system 1 to combat such rootkit cloaking techniques by bypassing standard file operations and instead uses direct memory mapped I/O. Memory mapped file I/O is more difficult for a malicious LKM rootkit to intercept and can be used to avoid cloaking techniques used by such rootkits. Moreover, memory mapped file I/O is much faster than standard file I/O operation. Thus, such a Investigation Module 3 can be used by other investigation modules for performance reasons as well as preventing future stealth rootkit activity hiding from detection.

Network Sniffers and PCAP Files

Hidden network sniffers are used to extract network traffic for malicious reasons such as stealing credentials. Many of these sniffers use built in libraries to accomplish their task with the primary library used being called libpcap that generates a file format called "PCAP" (short for Packet CAPture).

An investigation module 3 as used herein may identify such network sniffers by searching the process table for programs with open files, then analyzing the open files to see if they are of the PCAP file format. If a program has a file open that is of the PCAP file type, then it is flagged as a possible sniffer operating on the host computer 2.

PCAP files also represent remnants of the network sniffers as they are used to store captured network data. While there are legitimate reasons for these files to be present on a host (e.g. network debugging), there are also a lot of malicious reasons which makes their presence suspicious.

An investigation module 3 as used herein may be configured to search specifically for hidden PCAP files or PCAP files in known suspicious locations such as /tmp, /dev/shm, and other critical system areas commonly targeted by Linux malware and rootkits.

Tampered or Invalid Login Shells

Another method used by attackers to maintain access to a host is to replace disabled accounts with valid login shells. For instance, on Linux, users with the shell named "/sbin/nologin" or "/bin/false" are presumed to not allow system login. However, an attacker can replace these binaries with a valid shell like "/bin/bash" and it could allow them to login even though to an administrator it appears as if they cannot.

An Investigation Module 3 may thus be configured to generate cryptographic hashes of all valid system shells such as /bin/bash, /bin/sh, /bin/csh, /bin/zsh, etc. The Investigation Module 3 may then check the common disabled login commands such as "nologin" and "false" to be sure they do not match the hashes of valid shells. If a match is found, then it is presumed the shell was renamed to an invalid type and an alert is generated with relevant forensic data.

Missing Login Audit Log Entries

Many attackers will attempt to remove themselves from system login audit logs after they gain entry to the host. This prevents administrators from seeing suspicious logins and helps the attacker conceal their activity.

The most common way to delete a login entry is to remove it from the system "wtmp" and "utmp" files. These two files keep login data for active and previous logins into the system.

There is a third login auditing mechanism however called "lastlog." Lastlog keeps only the last login of a user whereas logs like wtmp keeps a record of all logins in time sequence for all users. While lastlog is useful for finding when a user last logged in, it is not useful to see a list of all logins and the times they did it.

Many log cleaning tools focus on removing entries from wtmp/utmp but leave lastlog untouched. As a result, Investigation Modules 3 can be created to detect such tampering.

An Investigation Module 3 may be configured to create a table of all users in the lastlog file. This table will include the last time users logged in. The Investigation Module 3 then creates a table of last logins from the wtmp file. They two lists are compared. If a user entry was found in lastlog, but the entry is missing from wtmp for the same time period, then the Investigation Module 3 determine that the user was deleted from the wtmp log and indicates the log is suspicous.

For example, a user called "john" logs in at 12:05 AM. This is recorded in wtmp and lastlog. The user john then deletes their login from wtmp at 12:05 AM but keeps previous logins untouched to not arise suspicion. However, they do not remove the login from lastlog.

The Investigation Module 3 may build a table from lastlog showing user "john" logged in at 12:05 AM on that day. Then it will build a table of logins for "john" from wtmp and show that the last login saved was at, for example, 9:17 PM the day before. Because the 12:05 AM entry is missing in wtmp, but not lastlog, then an alert is generated that the entry "john" was deleted maliciously.

Suspicious Log Cleaning

Many pieces of malware make an incomplete attempt to clean their presence by deleting all system log entries and replacing them with files that are zero bytes in size. This can result in a dozen or more files removed and it is very hard to recover the data to discover what happened.

An Investigation Module 3 may thus be configured to investigate the host computer 2 to ascertain such activity by looking at common system log areas such as /var/log on the target system. This Investigation Module 3 will count the number of audit logs that exist and compare it against the file sizes. If the Investigation Module 3 determined a preponderance (e.g. >50%) of zero-byte sized logs then the Investigation Module 3 returns investigation data indicating the logs are suspicious. It is very unusual for Linux to have many log files that are all concurrently zero bytes long which makes this kind of investigation module particularly useful.

Bindshell Backdoors

'Bindshell backdoors' are a way for attackers to gain access to a remote host. They are methods that use built-in programs on the targeted system to connect back to an attacker's machine or open a local network port to allow the attacker to connect and then gain access.

An Investigation Module 3 may thus be configured to investigate the host computer 2 to retrieve and analyse the process table and analyze common tools to see if they are operating as bindshells. In particular, the Investigation Module 3 may search common tools such as netcat, socat, telnet, python, ruby, perl, and similar utilities to see if they are running a system shell, are connected to a network port, and have open file descriptors commonly used for bindshell activity. If the Investigation Module 3 determines such combinations of data form attributes the Investigation Module 3 returns investigation data indicating the process is suspicious.

Detecting Deleted Processes

Linux malware in the form of a binary will often install itself onto a system and then delete the binary from the disk to conceal its presence. Once memory-resident, the binary does not need to be on the disk. By deleting itself, the binary avoids detection by common file scanning and file integrity methods.

An Investigation Module 3 may thus be configured to investigate the host computer 2 to search for deleted processes running on the remote host. While there are some legitimate reasons why a binary may be deleted (such as during an upgrade), deletions are mostly for malicious reasons. The Investigation module 3 searching for such activity will go through the process table to get the full path to the running binary. The investigation module 3 will go directly to the binary path to ensure it exists on the system to avoid false alarms. If the investigation module 3 does not locate the binary on the disk, but it is still present in memory, then the investigation module 3 returns investigation data indicating the corresponding process is suspicious.

Detecting Processes with Listening Network Ports in Suspicious Locations

Many pieces of malware will setup network operations once active. At the same time, these binaries will be located in system areas that are unusual and therefore suspicious. For instance, the malware may be located in system/tmp or/dev directories.

An Investigation Module 3 may thus be configured to investigate the host computer 2 to search for this kind of activity. If the Investigation Module 3 detects a process running from a suspicious location with network activity such as /tmp, /dev, or other critical system areas not normally used for this purpose, then the investigation module 3 returns investigation data indicating the corresponding process is suspicious.

Running Processes from Suspicious Directories or Names

Many pieces of malware will try to hide their presence by loading themselves into hidden or obscure system directories. This is an attempt to prevent discovery of the binary and associated data by making them difficult to locate on the file system.

An Investigation Module 3 may thus be configured to investigate the host computer 2 to search for any process running from a location in a list of locations considered as unusual or suspicious locations. For instance, the Investigation Module 3 may identify processes running from hidden directories, from unusual system directories commonly used by malware (such as /tmp or/dev/shm), or processes named in unusual ways. In the last example, the Investigation Module 3 may identify suspicious processes as processes named as a hidden file, with only one character as the name, named with spaces, named as another process but with a different case (e.g. crond vs. Crond), and similar permutations. The Investigation Module 3 may then return investigation data indicating the suspicious process.

Python, Perl, PHP, and Ruby Scripts Running in Unusual Locations

Many malware types after a website compromise will inject malicious code to be run by the server in a scripting language like Python, Perl, PHP, or Ruby. Often, this code will run out of the system /tmp or/dev/shm directories because they are world writable by the webserver.

An Investigation Module 3 may thus be configured to investigate the host computer 2 to search for Python, Perl, PHP, or Ruby scripts running out of /tmp or /dev directories as this is considered extremely suspicious behavior on Linux systems. The Investigation Module 3 may search for Python, Perl, PHP or Ruby code but any scripting language or binary can be used in a similar way. When the Investigation Module 3 detects these types of programs running from /tmp or /dev directories the investigation module 3 returns investigation data indicating the corresponding process is suspicious.

Strace Running

Strace is a tool used to trace a running program for debugging purposes. However, it can be re-purposed to extract confidential data from a running program by having the tool attach when the program runs. For example, strace can be attached to the system "ssh" program to extract passwords when the user calls ssh to login to another host.

An Investigation Module 3 may thus be configured to investigate the host computer 2 to search for any process with strace attached to it for more than a predetermined period of time—e.g. two minutes. The time delay is used so that the Investigation Module 3 doesn't generate an alert for legitimate strace users when debugging a process, which normally takes a short time, while the Investigation Module 3 does generate investigation data indicating the corresponding process is suspicious if a malicious user keeps strace attached to extract large quantities of data.

Detecting Anti-Forensics in Use with a Process

Anti-forensics are methods attackers use to prevent analysis and detection of their activity. On Linux one common anti-forensics tactic is to prevent logging command history by setting the history file environment variables such as HISTFILE to not log data by dumping the variable to places like /dev/null or setting it to be zero bytes allowed. These environment variables are attached to every process the user subsequently executes and the commands they used during that time are not saved.

An Investigation Module 3 may thus be configured to investigate the host computer 2 to search for processes that have environment variables set that indicate anti-forensics are in use. For example, the environment variable HISTFILE=/dev/null is a typical anti-forensic method. The Investigation Module 3 may be configured to analyse all running processes and if the Investigation Module 3 determines an environment variable indicates anti-forensics are in operation, the investigation module 3 returns investigation data indicating the corresponding process is suspicious.

Detecting Orphaned or Malicious SSH Authorized Keys

Secure Shell (SSH) is the most common way for users to gain access to Linux and related Unix based operating systems. One feature of SSH is to allow password access, but also SSH allows public/private key access if a user chooses to put their public key in a file called authorized_keys under their home directory.

Any public key in authorized_keys would allow login if the remote user has the correct private key to go with it. In this way it replaces less secure passwords with a stronger authentication mechanism of a public/private key which is much harder to guess.

Malicious actors however can inject their own public key into a user's authorized_keys file to allow remote access where it may appear no login is allowed. For instance, if a database user is called "database" and was only used to allow the system to run a database cluster you would normally not allow remote login access. However, if an attacker gains access to the system they could create an authorized_keys file under that database user's home directory and from that point use it to login as that user.

Furthermore, disabled users may have left behind authorized_keys files as orphans by accident. If an attacker that can gain access to the private key for these disabled users, they may be able to login as them even though administrators thought the accounts were disabled.

An Investigation Module 3 may thus be configured to investigate the host computer 2 to search for these conditions e.g. if the Investigation Module 3 detects a disabled user with a valid authorized_keys file in their home directory the Investigation Module 3 will return investigation data indicating the corresponding authorized_keys file is suspicious.

A broad description of the investigation system 1 will now be described with respect to its operation on an exemplary host computer 2 and with respect to FIGS. 3-7.

Figure 3:
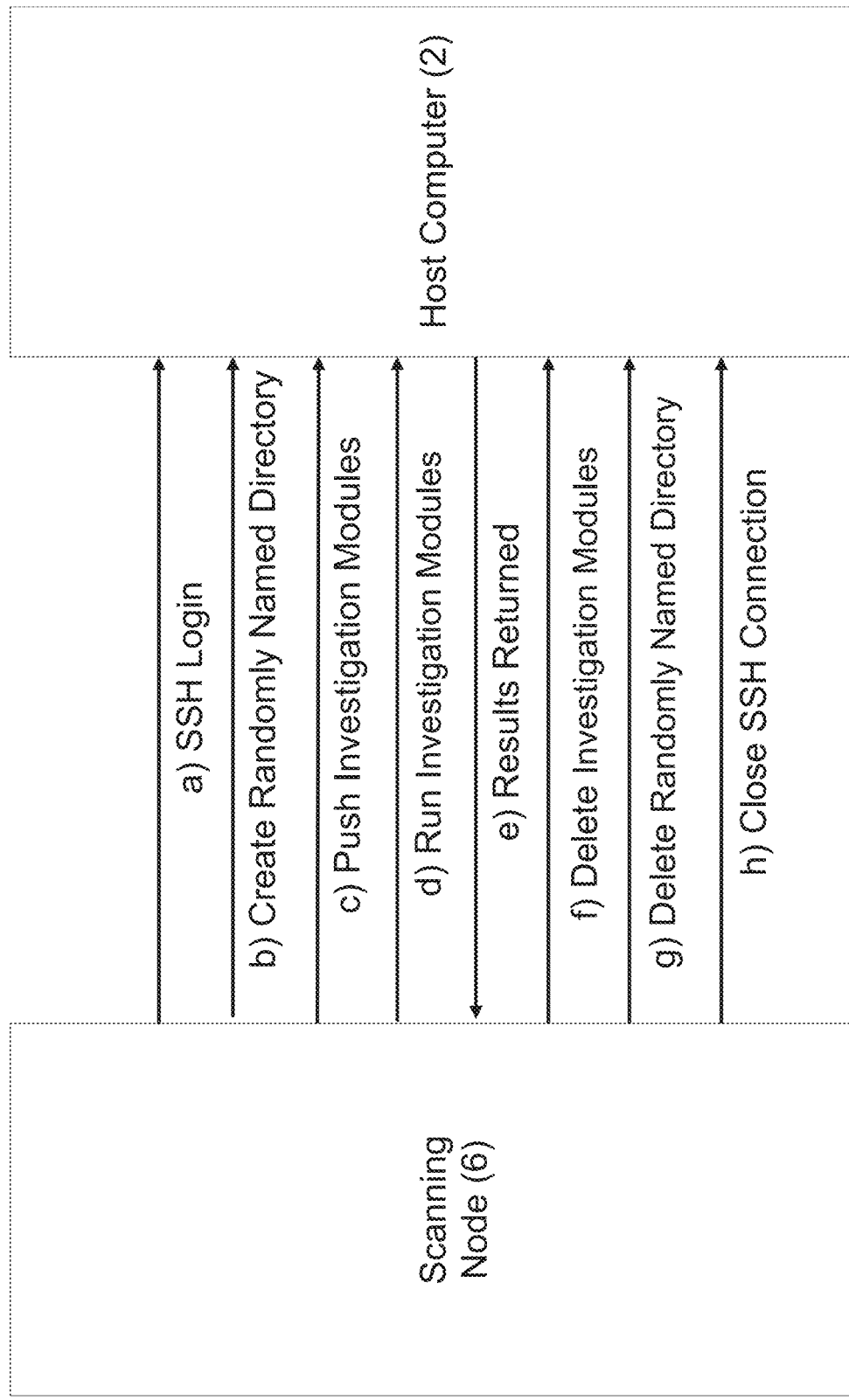
FIG. 3 shows a further schematic diagram of the general method of operation of the investigation system.

FIG. 3 shows a high-level schematic of how the investigation system 1 scans a host computer 2 using SSH Python or Unix shell scripting. The process includes:

a) a scanning node 6 establishes a connection to the host computer 2 with SSH credentials supplied by a user.

b) the scanning node creates a randomly named directory on the remote host computer 2, ideally in a secure area on the host computer 2.

c) the scanning node 6 sends investigative modules 3 to investigate the host computer.

d) the investigative modules 3 execute on the host computer 2 to perform their investigative functions.

e) the results from the investigative modules 3 investigations are sent back to the scanning node 6 and then to control server 5. Results may include relevant forensic data that can be used for further analysis if required.

f) The investigative modules 3 are deleted from the host computer 2 entirely and no presence is left behind.

g) the randomly named directory on the host computer 2 is deleted.

h) The SSH connection is closed down.

The investigative modules 3 may have many functions and may check for various signs of intrusion, indicators of compromise, collect forensic data, run response actions or perform other functions as defined by the investigative module 3.

Figure 4:
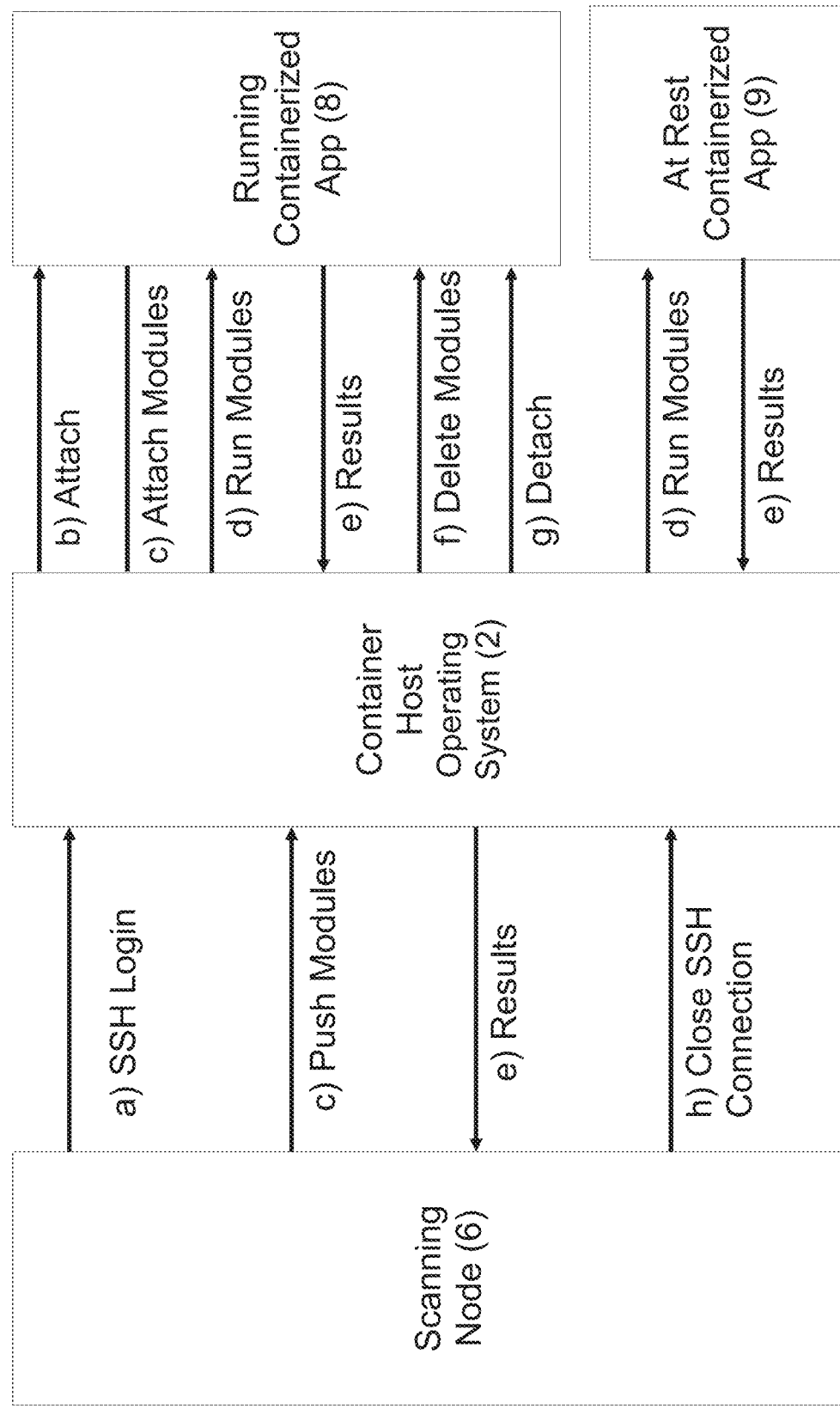
FIG. 4 shows a high-level schematic diagram of the method of operation of the investigation system utilised with containers.

In addition to the above, the investigative modules 3 can be made container aware as illustrated in FIG. 4. This means that investigative modules 3 are able to run against host computers 2 with Docker™, Kubernetes™, or similar container management and deployment platforms. In this configuration, the investigative modules 3 can check static container images 9 for signs of compromise or can attach to running containers 8 to do the same.

The process for investigating running containers 8 is similar to that for checking a standard host computer 2 with some additional steps and includes:

a) After connecting with SSH, a list of running containers 8 is obtained;

b) running containers 8 are attached to by the scanning node 6;

c) investigative modules 3 are pushed over;

d) investigative modules 3 are then run inside the container 8 as they would be on any host computer 2;

e) Results are returned;

f) the investigative modules 3 are deleted from the container 8.

g) the scanning node detaches from the running container 8;

h) SSH connection is terminated.

Even if the container is not running SSH, the scanning node 6 can connect with shell access or similar mechanism and use investigative modules 3 as it does on a host computer 2. These investigative modules 3 once attached to the executing container 8 can then be run and report back findings as normal.

Docker™ and similar containerized applications at rest 9 (e.g. not running) may be present on a disk in the standard file system of a host computer 2. Investigative modules 3 made to look for problems inside containers at rest 9 can investigate the filesystem directly and report back their findings as discussed previously.

Docker™ and similar containerized applications that are executing (e.g. running a micro-service such as webserver or database) can be scanned as well. Although containerized applications offer significant security benefits over those that are not in a container, it is still important to inspect inside running containers to make sure that they have not been compromised.

There is a difference between the host computer 2 running the containers and the containers themselves though. It is entirely possible that the host computer 2 is not compromised while containers it is serving have been compromised. Meaning that the attacker was not able to escape the container (which is by design) to attack the container host computer 2, but the container itself is no longer secure.

Thus, the investigation system 1 may enable administrators to look inside containers for actively running threats just as they can the host computer 2 running the containers. As shown in FIG. 3 the procedure of SSH logging in and pushing over investigative modules 3 to the host computer 2 is the same as for investigating only the host computer 2 as previously described. However, when in a container scanning mode the investigation system 1 can obtain a listing of active containers 8 on the host computer 2. The investigative modules 3 may then attach to these active containers 8. Once attached, the investigation system 1 is able to use send into the container the relevant investigative modules 3 to run. Once the investigative modules 3 have visibility inside the container, the investigation system 1 will run those checks and report back results just as if those investigative modules 3 had run on the host computer 2.

Because the investigation system 1 may use very small text-based interpreted code for the initial investigative modules 3, the investigation system 1 can work over a standard shell attached to any running container 8. There is no need to move over large binary files which often require special services which are not typically loaded inside container images.

Furthermore, most container images do not run an SSH server as standard practice. the investigation system 1 can take advantage of this aspect by using SSH to log into the container host computer 2, and then once logged in to the main host, using investigative modules 3 to investigate the containers the host computer 2 is running. This is a very practical and unique way to gain visibility into the container runtime without modifying anything.

Additionally, in the above method there is no need to install anything on the containerized application other than Python on the host operating system running the containers. As Python is widely deployed and easily installed into container host operating systems, this is again a minimal impact requirement on the part of developers and administrators to do. In other embodiments, statically built investigative modules 3 in other languages may be used to look into executing containers to perform investigations as required. Finally, if none of these options are available the Python-less Unix script version of the investigative modules 3 can be used to bulk gather data for analysis by the server 5 in substantially the same way.

The investigation system 1 thus requires no software agent inside container images. Even if the container image is not under customer control, it is likely that the investigation system 1 can scan inside it to look for signs of compromise and alert administrators to a problem.

FIG. 4 also shows containers at rest 9 are images residing on the host computer storage system. These images 9 are used to start running containers 8 to serve various services. In this case the scanning node 6 does not need to attach to a running container 8, but instead can send investigative modules 3 inside the container files 9 on the host computer 2 for signs of compromise using the standard host scanning process described earlier.

In some embodiments the initial or complete investigation may be performed on the host computer 2 instead of exporting the data elsewhere for analysis. Prior art systems may use software agents or agentless approaches using comprehensive scans may collect large amounts of data such as processes running, cryptographic hashes, log files, etc. This data is then packaged up and sent for analysis by a remote engine. However, this data may include confidential or sensitive information and sending that data from the host computer may be considered a security risk or data breach.

Therefore, in contrast, the method performed by the investigation system 1 does an initial investigation in place on the host computer 2. Investigative modules 3 are used that are self-contained to do investigation and analysis on the host computer 2 without the need to send any data out to an external analysis engine. This means the existing network architecture can be leveraged to obtain the following benefits:

A. Faster investigation—as the host computer 2 being investigated is doing the first pass of analysis using its own CPU, memory, and disk versus sending volumes of data to a central server for processing over the network.

It is much faster to have the host computer do a first pass investigation using its own resources than it is to send back a large amount of data to a centralized system to process. This is as opposed to prior art approaches that send large amounts of data over the network to a central system that then needs to analyse the results and may experience network bottlenecks. It is difficult to scale such a centralized analysis mechanism as thousands of host computers may be connected all sending back large volumes of data for processing, often simultaneously. The present investigation system 1 leverages the distributed computing power of the network to assist in reducing data volumes by performing investigation locally and only sending back data that is determined to warrant further analysis.

B. Safer investigation—as potentially confidential data is not sent off the host computer 2 to an external system which could expose the data to theft.

It presents a risk to send out data from a host computer 2 for analysis. If a product is sending out large amounts of information for analysis, that data could be useful to attackers if they gain access to the database where it is stored. The data could reveal file locations, user account details, company proprietary data, software installed, and other potentially confidential or sensitive information. Moreover, such prior art systems provide a centralized repository for this data where it wouldn't have existed before.

In contrast, the investigation system 1 is configured such that it doesn't normally retrieve potentially confidential data unless an investigative module 3 determines the confidential data is stored on a compromised system and is required to be retrieved for further analysis. The data may be packaged and sent to the server 5 for review by a human and ideally only in the context that the data could be relevant to a compromised system.

However, in an alternative embodiment, utilising Unix shell scripting bulk data may be collected and analysed by a backend rules engine with largely similar results to the aforementioned method. In this embodiment the investigation system 1 is configured to ensure minimal confidential data is extracted from the host during the analysis. Only data necessary to determine if a compromise has occurred is collected unless the operator initiates further deeper inspections.

Figure 5:
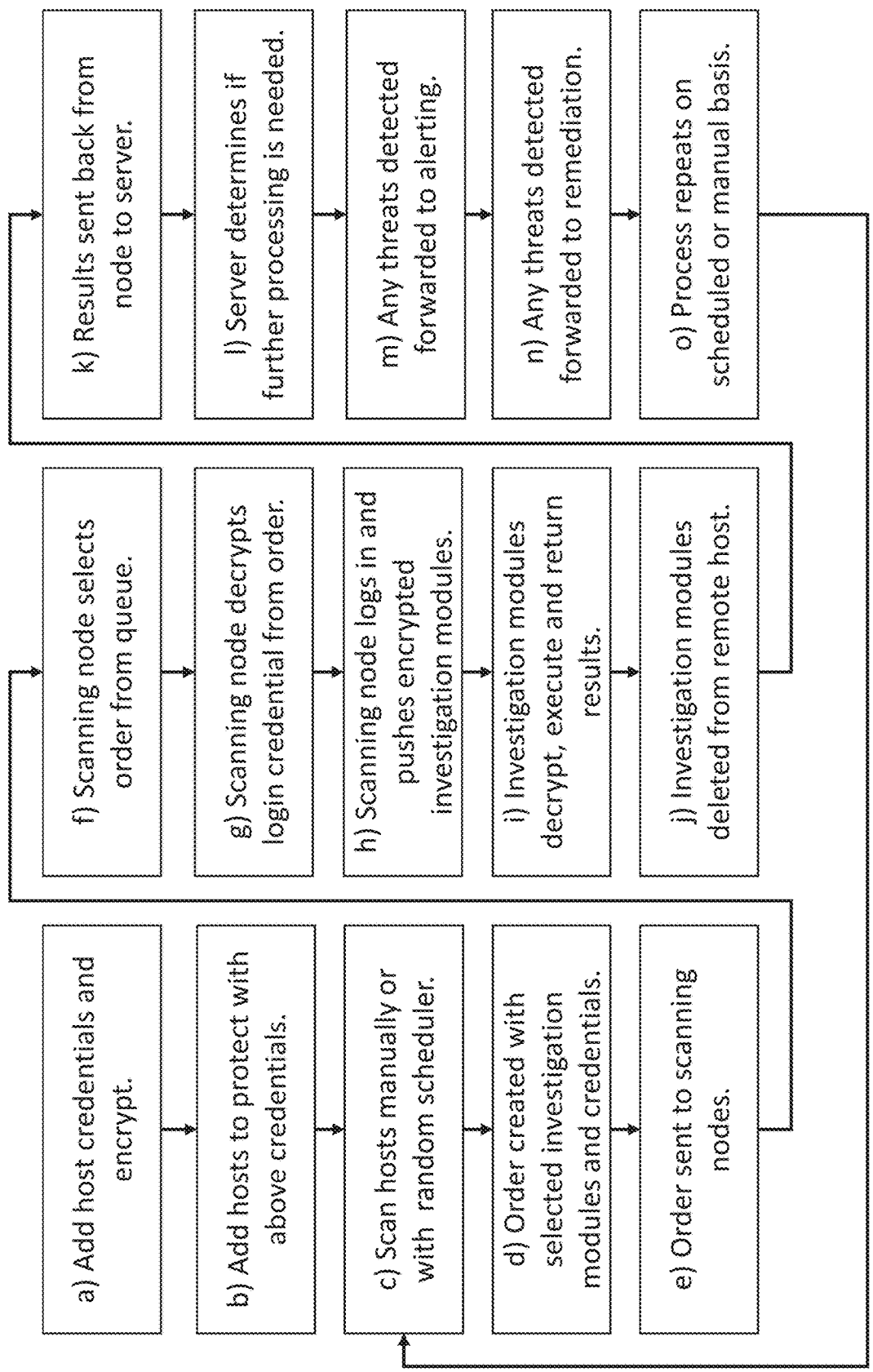
FIG. 5 shows a flowchart of the general method of operation of the investigation system.

FIG. 5 shows a flowchart of a general method of operation comprising various steps in the process and includes:

a) Host SSH credentials are received by server 5 from a user. The server 5 encrypts the SSH credentials with a scanning node public key and can no longer access the credentials. Credentials are stored in the server database 7 always encrypted with the node public key.

b) The user can add a host computer 2 by IP address, IP address range, IP list, API access to a cloud service provider, or other similar mechanism. They also provide the server 5 with the encrypted credentials to use to enable SSH login for the host(s). For instance, if the user added an SSH credential called "web_server_credentials", the user can instruct the server 5 to use those credentials when trying to log into the user's web servers (host computer 2) to perform the investigation. Records are loaded into the database 7 with the host credentials received at a), the records containing data including the host computer IP address or other identifier and received credentials;

c) An instruction is received to scan hosts, either from a manual instruction or as a result of a scheduler indicating a host is to be scanned. After adding at least one SSH credential and valid host computer, the user can provide requests for system information, security scans on demand, or scheduled scans of the host computer;

d) An order, comprising computer-readable data, is created with selected investigated modules to be sent and the host computer credentials;

e) The order is sent to the scanning nodes 6 via the network;

f) The scanning node 6 is programmed to select an order from the messaging queue 11;

g) The scanning node 6 decrypts the login credentials received in the order.

h) The scanning node 6 logs into the remote host computer using SSH with the credentials provided and now decrypted. The scanning node 6 then sends encrypted investigation modules 3 to the host computer 2.

i) The investigation modules 3 are then decrypted, executed and return results through the REST API 10 10, either to the scanning node 6 (in alternative embodiments to the host computer 2). In execution, the locally installed Python interpreter is run using the investigative modules 3 now present on the host computer 2. If Python is not available, a Unix shell script shim is sent which collects similar data but sends the data back to the control server 5 via scanning node 6 for rule engine analysis.

j) The investigation modules 3 are then deleted from the remote host computer 2.

k) The results received by the scanning node 6 is sent back to the server 5.

l) The Server 5 determines if further processing is needed and sends an order to the scanning node 6 if further investigation is required. The order will contain a list of further investigation modules 3 to send to the host computer 2.

m) If any threats are detected and indicated in the results, details are forwarded as alerts to an operator, file or user.

n) If any threats are detected and indicated in the results, the threats may be remediated through sending further investigation modules 3 via order to scanning node 6 or details sent to the host computer for manual remediation or remediation by local system.

o) The entire aforementioned process repeats on a scheduled or manual basis.

Figure 6:
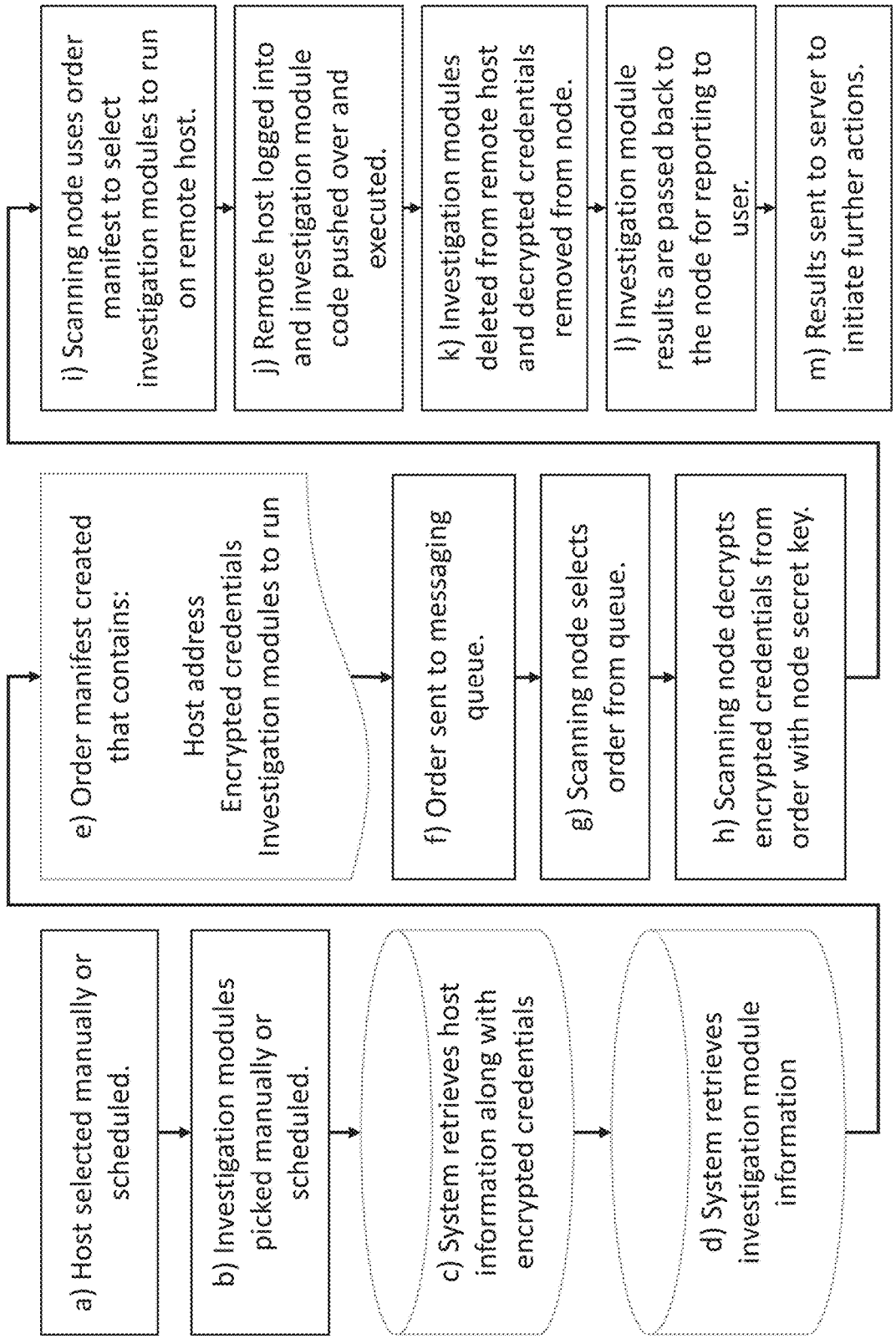
FIG. 6 shows a flowchart of the general method of operation of investigating a host computer according to one embodiment.

FIG. 6 shows a method of investigating the host computer 2 according to one embodiment. The method generally includes the following steps:

a) The control server 5 selects the host computer 2 to be investigated, either due to manual instruction or according to a schedule.

b) The control server 5 runs a scheduler (shown in FIG. 9) to select the investigation modules 3 that are to be sent to and run on the host computer 2. Alternatively, a user may manually specify which investigation modules 3 are selected.

c) The control server 5 queries the database 7 with an ID or other unique data form attribute of the host computer 2 selected at step a) and then retrieves the host computer information and encrypted login credentials for that host computer 2.

d) Similarly, the control server 5 queries the database 7 with an ID or other unique data form attribute of the investigation modules 3 selected at step b) and retrieves investigation module information.

e) an order is created in the form of an electronic file that contains data such as host computer address, the encrypted credentials, and the investigation modules 3 to run.

f) the order is sent to the messaging queue 11 on the control server 5.

g) the scanning node 6 queries the messaging queue 11 for pending orders from the control server 5 in the messaging queue and selects an order. The order selected may be randomised, based on longest pending order or any other condition, to assist with load balancing, or if scanning nodes operate on different network segments and cannot access the requested host to scan.

h) the scanning node 6 decrypts the encrypted login credentials using the scanning node's secret key.

i) the scanning node 6 reads the order manifest and retrieves the corresponding investigation modules 3 from disk.

j) the scanning node 6 connects to the host computer 2 and logs in with the decrypted credentials. The scanning node 6 then sends the investigation modules 3 to the host computer 2 and they are executed thereon.

k) after the investigation modules 3 are run on the host computer 2 the scanning node 6 sends instructions to the host computer 2 to delete the investigation modules 3. The scanning node 6 also deletes the login credentials.

l) as part of step j) the investigation modules 3 send results of their investigative functions back to scanning node 6 as data in an electronic file.

m) these results are then sent to the control server 5 to initiate further actions as necessary.

Figure 7:
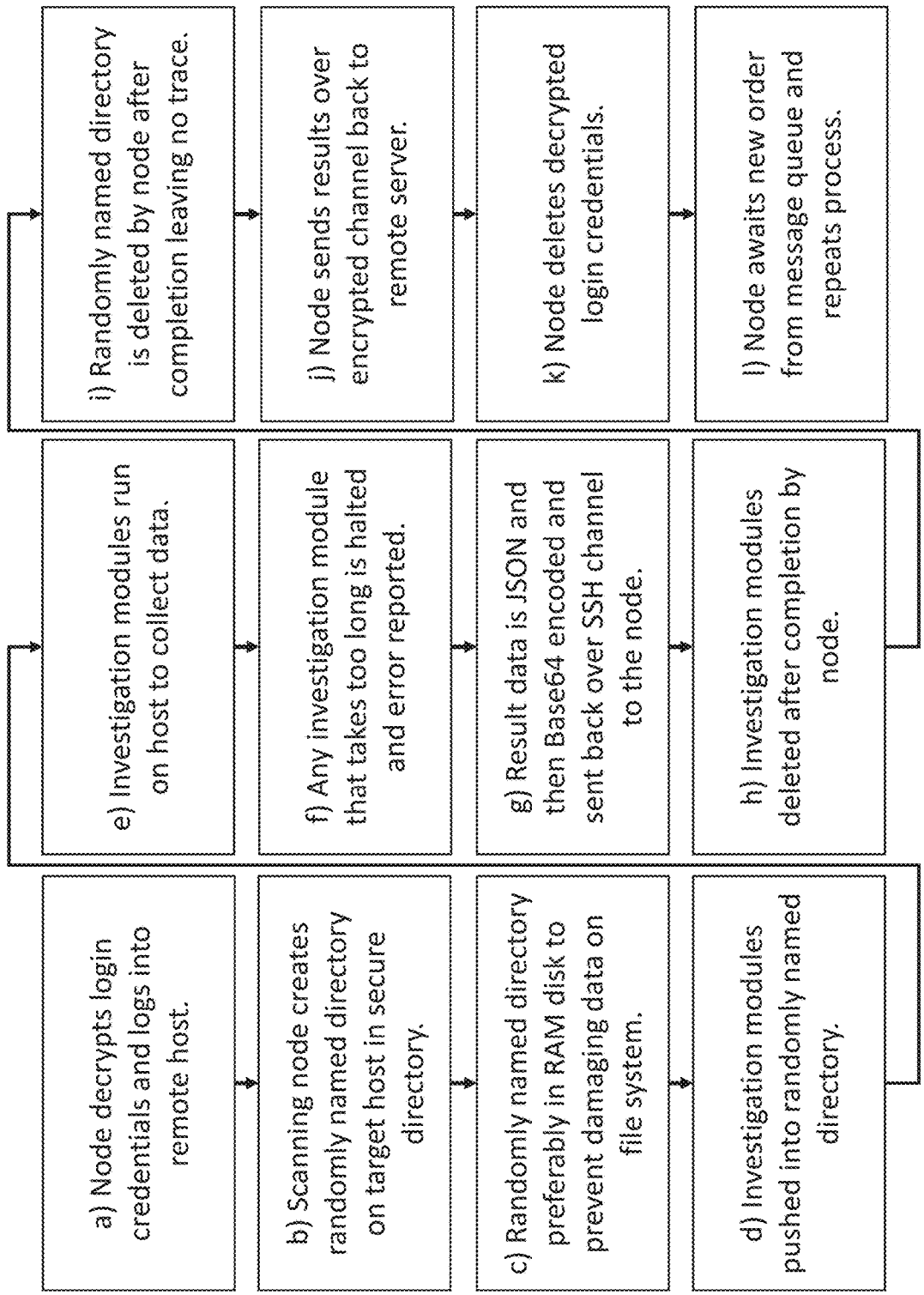
FIG. 7 shows a flowchart of the general method of operation of investigation modules on the host computer according to one embodiment.

FIG. 7 illustrates the general process and components of the investigation on the host computer 2 and includes:

a) the connection of the scanning node 6 to the host computer 2 by decrypting login credentials and logging into the host computer 2.

b) the scanning node 6 then sends instructions to the host computer 2 to create a file directory (with random name generated by scanning node).

c) The directory is ideally created in a secure area of the host computer 2 such as RAM to prevent damaging data on the host computer 2. Alternatively, the directory may be created in non-volatile memory.

d) the scanning node sends the investigation modules 3 to the directory in RAM.

e) the investigation modules 3 are run on the host computer 2 and collect data.

f) Errors or alerts are reported to the scanning node 6 if an investigation module 3 takes too long to execute, is halted or is stopped by the host computer 2.

g) the results of the investigation module 3 investigation are written to a JSON file then Base64 encoded for transmission of the SSH channel to the scanning node 6.

h) the scanning node 6 sends instructions to the host computer 2 to delete the investigation modules 3.

i) the scanning node 6 sends instructions to the host computer 2 to delete the randomly named directory to ensure there is no residual trace on the host computer 2 that an investigation has been performed.

j) the scanning node 6 deletes the decrypted login credentials to ensure that even if the scanning node is compromised the login credentials are inaccessible.

k) the scanning node 6 then awaits a new order and once received repeats the preceding steps for the new order.

The scanning nodes 6 ideally don't communicate with the end-users directly. Scan requests come from the server 5 via a manifest over the messaging queue 11. Results 4 are sent back to the server REST API 10 10 for display and storage. Users cannot log into the scanning nodes 6 directly though the server 5 or UI.

The reason for this isolation is how the scanning nodes 6 login to the host computer 2. The investigation system server 5 stores encrypted SSH login credentials but cannot decrypt them. The scanning nodes 6 contain decryption keys for SSH login credentials but does not store SSH keys itself. A user or intruder needs access to both the control server 5 (which holds the encrypted SSH keys) and scanning nodes 6 (which can decrypt the SSH keys) to access encrypted SSH credentials.

This split in responsibility provides extra security in the case either the control server 5 or a scanning node 6 is compromised. Without having both compromised simultaneously, it makes it harder for an attacker to access SSH credentials for the network. Attackers need the encrypted SSH credentials stored on the investigation system server 5 and the decryption key stored on the secured scanning nodes 6 to access valid SSH login credentials. By blocking user access to the scanning nodes 6 an extra layer of security is provided against having the node private keys taken if there were a vulnerability in the UI. In this case of an investigation system server 5 compromise an attacker can gain access only to the database 7 but will not have access to scanning nodes 6 that contain sensitive decrypted information.

This investigation system 1 contrasts to prior art systems that may store credentials entirely in a single data store. In many prior art systems a compromise of the data store means that all credentials are compromised.

Securing SSH keys and username/passwords against theft is important. If an attacker gains access to SSH credentials it means they can access host computers quickly and with little chance of detection.

The investigation system 1 works to mitigate this potential problem in two ways, Separation of responsibilities and Encryption of credentials at rest.

Figure 8:
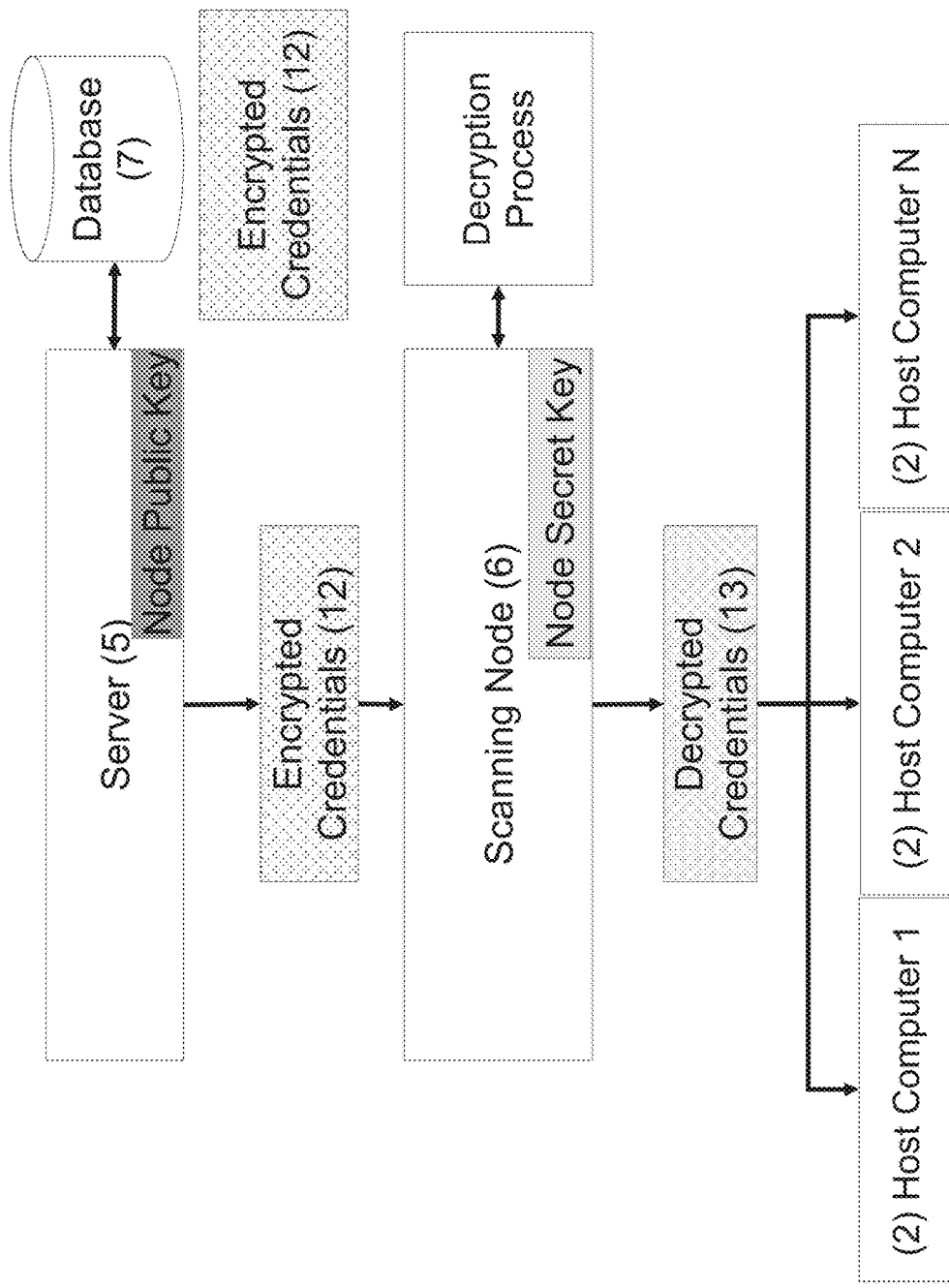
FIG. 8 shows a high-level schematic diagram of credential management utilised by the investigation system.

As illustrated in FIG. 8, during installation of the scanning node 6 a public/private key pair is generated. The private key is kept secured on the scanning nodes 6. The public key is installed on the control server 5. The private key is kept secret on the scanning nodes 6. The public key can be made freely available, but for purposes of security it is kept secured by the control server 5 as an extra precaution.

When a user wishes to add SSH credentials to allow the investigation system 1 to login and scan a host computer 2, the control server 5 takes the SSH credentials and immediately encrypts them with the scanning node public key. The encrypted data is then inserted into the database 7. The control server 5 can no longer decrypt these credentials after this happens. This also means that even if the main control server database 7 were to be compromised, no usable host credentials can be stolen and used as they are irreversibly encrypted without the scanning node's private key.

When a scan is requested, the control server 5 collects the host computer information and encrypted SSH credentials and packages it into an order manifest. The order manifest is sent to the scanning nodes 6 and contains data specifying what investigative modules 3 to run, what host computer 2 to run them against, and other relevant information such as how to login to the host computer 2 with the SSH credentials.

The scanning nodes 6 take the encrypted SSH credentials and decrypt them with their secret key. If the data decrypts, then the rest of the manifest is run normally. If the scanning node 6 cannot decrypt the encrypted data (for instance due to an invalid key), then an error is returned.

As scanning takes place, the scanning node 6 uses the decrypted credentials to login to the host computers 2 and collect data. These credentials are not stored on the scanning node disk and only used in RAM. Once the scan is complete, the decrypted credentials are disposed of and the scanning node 6 loses access to them until the next scan is sent.

As shown in FIG. 8, the server 5 stores encrypted credentials 12 but cannot read them while the scanning nodes 6 can decrypt the credentials 12 but does not store them.

The separation of responsibilities of the scanning node 6 and server 5 ensures that if the server database 7 is compromised that an attacker cannot steal SSH unencrypted credentials to compromise host computers 2. At the same time, a scanning node 6 that is powered-down does not store SSH credentials used to login. If a scanning node image were stolen for instance, SSH credentials are not able to be accessed as the scanning nodes 6 do not store active SSH credentials.

This arrangement enables login credentials to be changed at only one place at any given time. While other management systems may have SSH keys scattered and make management difficult, the present investigation system 1 has SSH credentials stored in one encrypted location on the server database 7 where they can be quickly deleted or changed but which cannot be decrypted without the scanning node keys.

If the user wants to use new SSH keys for login they may delete the old ones from the investigation system server 5, add new SSH credentials, and they are again encrypted and ready to be used by scanning nodes 6 as part of any new manifests pushed out. During the next scan, the server 5 may push down the newly encrypted credentials and the nodes 6 can decrypt them as usual.

Likewise, if a user suspects a node image was stolen, they can delete all credentials, generate new public/private keys for the nodes 6, and insert new SSH credentials. Thus, the nodes 6 can no longer decrypt the SSH credentials and use them maliciously even if powered up by an attacker who gains direct access to the messaging queue system 11. The stolen node image has invalid secret keys and they cannot be used to read any credentials encrypted by the changed keys from the server 5.

Adding a host computer 2 to be investigated by the investigation system 1 requires a valid network address or hostname and login credentials. The aforementioned embodiments use SSH to login to host computers 2 so the login credentials need to be either a username/password combination or a generated SSH private/public key pair.

To add a host computer 2, the user may enter either a single IP address, IP address network range, a list of IP addresses, cloud service API access key, or similar method. The user then specifies what credentials to use (as added under Credentials Management). For instance, if the user wants to add all host computers in the development department, they would enter in the IP address range to add. Then the user may specify what credential to use. For example, they may have entered an SSH key pair called "development" for use on all systems that are in the development department of their company.

After this, the user may provide instructions that all host computers in the specified range are to be added using the specified credentials. The investigation system 1 will attempt to login to each host address given with the credentials "development." If the login is successful, system information about operating system type, versions, etc. will be gathered and returned to the server for database storage. The host computer 2 is now considered active and can be added to the scanning pool for future investigation.

When the investigation system 1 scans a host computer 2 it will connect using SSH and a user supplied username/password or SSH private key as security procedures require. Once connected, the investigation system 1 will then determine what version of Python is loaded and various operating system data form attributes such as software versions, build versions, memory size, disk size, kernel versions, and other factors. These data form attributes are then returned to the database 7 to be stored with scanned system details.

If Python is not loaded, then alternatively a Python-less version of the investigative modules 3 can be used. This version leverages the local computer's Unix shell scripting to emulate many data form attributes of the Python modules. The primary difference being that it relies on bulk data collection of relevant system attributes such as the process tables, directories, and files. This bulk data is then sent back to the server for analysis in the back-end rules engine vs. on the host with the Python implementation.

Once the operating system data form attributes of the host computer 2 are gathered, the investigation system 1 will then check compatibility for scanning. The investigation system 1 may then send various investigative modules 3 which may look for signs of compromise or suspected problems on the host computer 2. It may also send investigative modules 3 that perform remediation or other actions on the host computer 2.

Investigative modules 3 are sent to the host computer 2 using the SSH SFTP protocol. This enables the investigation system 1 to send a large number of investigative modules 3 quickly. Once sent with SFTP, each investigative module 3 is executed on the host computer 2 by calling the locally installed Python interpreter. If Python is not being used in lieu of a statically compiled binary such as Go, then the binary itself is called directly. If these methods are not available, then the Python-less Unix script modules are used to collect bulk data for analysis on the control server 5 or scanning node in a rule engine.

Each investigative module 3 executes and collects relevant data to determine the security state of the host computer 2 for that investigative module's function. For instance, an investigative module 3 that has the function to look for suspicious user entries will look for that single problem and report back its findings.

Once the investigative modules 3 finish running, the collected data is sent back to the investigation system server 5 by the scanning node 6 for storage in a suitable database for reporting and analysis if needed. This analysis may also instigate follow-on investigations with other investigative modules 3 as deemed necessary. The findings for all investigative modules 3 is in a standardized JSON format that is encoded for transmission back to the scanning node 6 across the open SSH channel for security and privacy. This JSON format is cross platform compatible and can be expanded as required to report back on any kind of data on the host computer 2. Data collected by investigative modules 3 can be about system configuration, compromise status, forensic data, or other kinds of information as required.

The scanning and reporting process may constantly occur across a network. It can occur on an ad hoc, scheduled, or unpredictable basis. The investigation system 1 defaults to using a random scheduling mechanism as described below so that the timing of the investigation by the investigative modules 3 is unpredictable. Random scheduling offers advantages in making it more difficult for intruders or malware to evade detection. By using a random schedule, it is harder for attackers to devise ways to avoid detection by removing their software ahead of regularly scheduled checks as happens in prior art systems. Furthermore, system performance impacts can be limited by not only using random investigation times, but also running only a selection of all the available investigative modules 3 at a time thereby lowering system resource usage. This selection of investigative modules 3 may also be random.

The investigation system 1 is configured to give the user the ability to randomly schedule investigative modules 3 to be sent to host computers 2. As the investigation system 1 is agentless, random scheduling can be used to make intruders or malware evasion more difficult.

Figure 9:
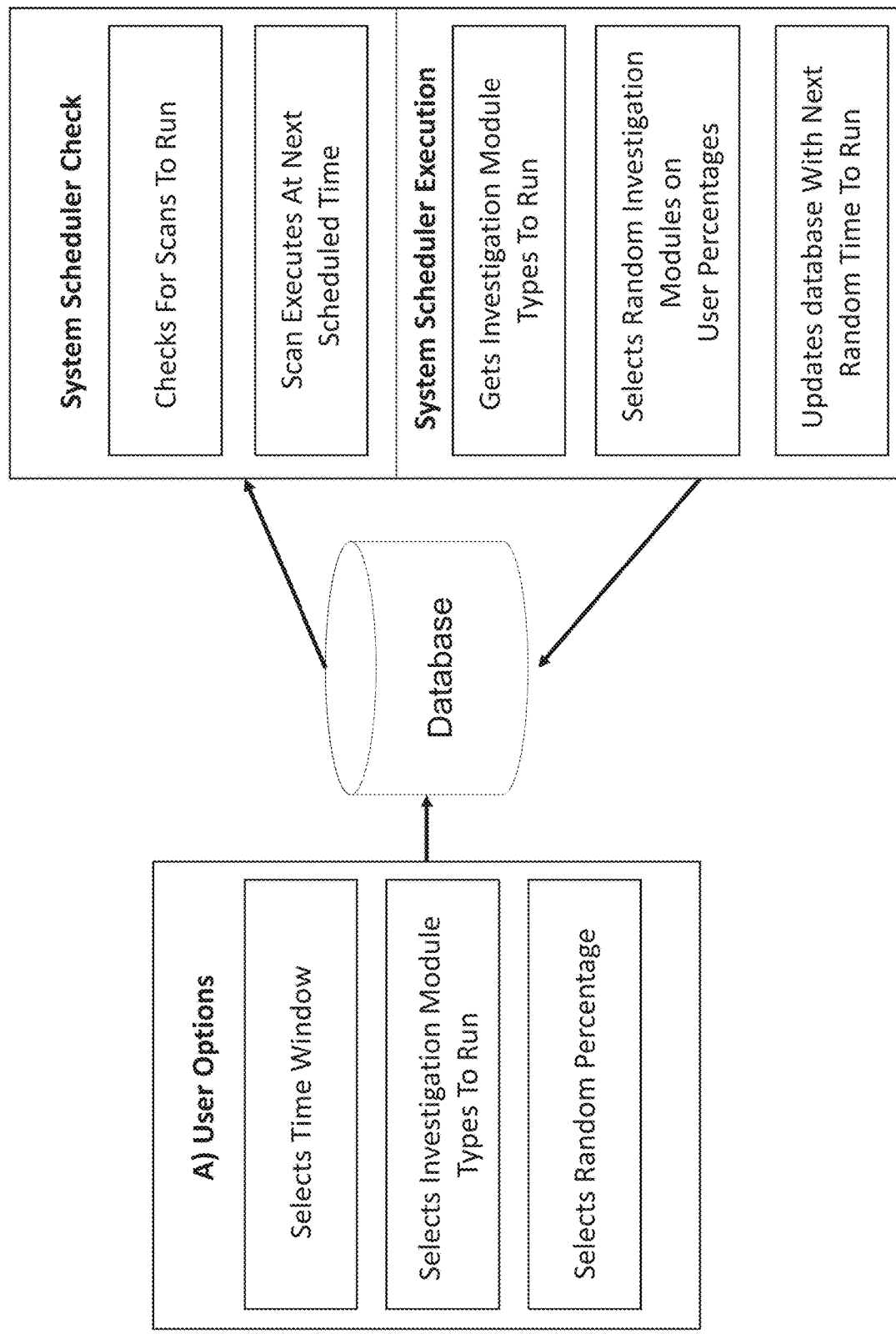
FIG. 9 shows a high-level schematic diagram of a scheduling system utilised by the investigation system.

The investigation system 1 includes a scheduler as illustrated in FIG. 9 with three primary values/parameters that the User may specify in their request for an investigation of the host computer 2. These variables may be modified when scheduling scans of host computers 2:

A time window in minutes (e.g. 60-120). The time window represents a time period in which the investigation and selected investigative modules 3 are to be run. The investigation may be repeated in subsequent time windows.

The investigative modules 3 to run (e.g. process investigative modules, file investigative modules, individual selection of investigative modules, etc.)

A proportion of investigative modules to run (e.g. 25%)

Once the user has specified these options they are stored in database 7.

One or more of these values may be made unpredictable to minimize the chance of an intruder being able to escape detection or detect the presence of the investigative modules 3.

For example, the time window may not follow a set time of day pattern. Instead of specifying "run a scan at 6 AM every morning" as prior art systems might, the time window allows a user to select an upper and lower limit. For instance, a user can specify "run a scan every 60-120 minutes with a random scan time between those values."

Using the above 60-120 minutes value, the investigation system 1 will select a random time to execute the next scan that is equal to or more than 60 minutes and less than or equal to 120 minutes.

For instance, the value of 73 minutes may be selected as the first random value between 60-120 minutes. When 73 minutes has elapsed, the investigation system 1 will run the scan against the specified host computer 2. After the scan is run, the scheduler then selects a new random time between 60-120 minutes for the next scan. In this case it may select 95 minutes as the next target time. Meaning that the next scan will happen 95 minutes into the future and so on. This process repeats each time a scan is run to select the next random time a scan is executed.

A selection of investigative modules 3 to run may be made from the library of available investigative modules 3. This selection may be predefined, random or determined by the user. The selection may for example include:

a particular group of investigative module types to run (such as only look for file or process attacks);

a custom group, or all modules.

The user may also set a random percentage of the investigative modules 3 to run for the scan. For example, if a user sets 25%, then the system will randomly select 25% of the total investigative modules 3 and then run those at the determined time. Any value between 1-100% can be used. The reason for using percentages less than 100% is twofold:

a) It reduces system resource impacts on the host computer 2 as not all the investigative modules 3 are run at once and instead spreads out the running of investigative modules 3 over time and therefore spreads the performance load on the host computer 2.

b) It makes evasion by malware or intruders (used interchangeably with the term "attackers") more difficult. Attackers trying to evade detection do not know what investigative modules 3 will be running at any one time. Investigative modules 3 may be a random set and not a pre-determined list of checks happening on a predictable basis as in the case of prior art systems.

Thus, not only does the investigation system 1 have reduced risk of evasion but it also lowers system performance impact relative to a scan using all available investigative modules 3. In one application the scans may collectively include all investigative modules 3 being run but spread over a day thereby providing 100% coverage of all investigative modules 3 spread out randomly to balance system impact with security. For example, 25% of all investigative modules 3 may be run at any one scheduled time. Yet, if that scheduled time happens four or more times a day then there is a probability that 100% of all investigative modules 3 will be run. This means the host computer 2 can receive greater than 100% coverage daily with investigative modules 3 without the massive impacts of full system scans happening on more regular schedules.

In contrast, prior art scanning solutions load a host computer with large numbers of checks at pre-determined times or on demand. The most typical case is anti-virus systems that are well known for slowing down host computers while they do comprehensive checks for system problems. This is annoying for end users and affects system performance drastically. The present investigation system 1 instead operates with minimal performance impact using its random scheduling system and random investigative modules scheduling while also increasing security by making evasion harder for attackers.

Each investigative module 3 by itself is highly focused and may miss attacks it was not designed to see alone. Yet when you have hundreds of investigative modules 3 running on a host computer 2 each looking for a particular problem, the overall level of protection is very thorough. Moreover, because each individual check is fast and has a low performance impact, the investigation system 1 not only provides better protection but does it for a much lower cost in terms of system performance impacts.

As shown in FIG. 9, the scheduler is a computer program that includes instructions to query the database 7 for a scan to run and retrieves the corresponding execution time. The scheduler includes instructions to run the scan at the scheduled execution time.

When the time triggers the scan the scheduler queries the database 7 for the Investigation Module 3 types to run (as specified by user) and selects a random selection of investigation modules 3 with the proportion of user specified investigation modules 3 selected matching the random percentage of modules to run.

The scheduler then updates the database with a new execution time to run the next scan based on the time window specified by the user.

Figure 10:
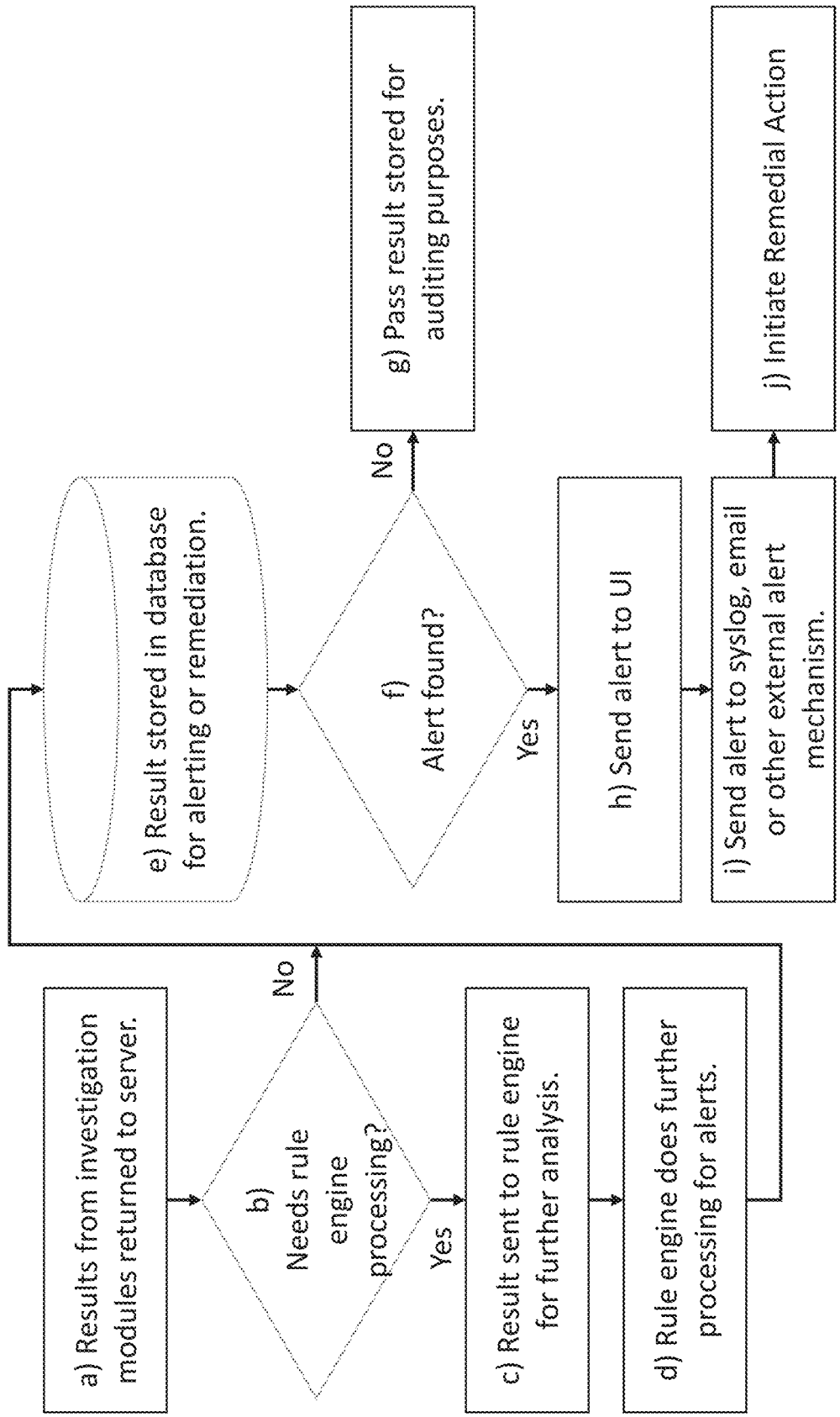
FIG. 10 shows a high-level schematic diagram of a method of investigation results management utilised by the investigation system.

FIG. 10 shows one embodiment of the processing of results returned by the investigation modules 3 and includes the processes:

a) the results are returned from the investigation modules 3 to the control server 5 via scanning nodes 6.
b) the control server 5 is programmed to process the data and determine if the results need rule engine processing.
c) If the control server 5 determines further processing is required ("Yes") at step b) the results are sent to a rule engine for further analysis.
d) A rule engine on the control server 5 performs further processing of the results to determine if alerts are generated.
e) If the control server 5 determines no further processing is required "No" at step b) the results are stored in database 7.
f) The control server 5 queries the results in database 7 and determines if any alerts are found.
g) If no alerts are found, the control server 5 logs a 'pass' result to the database 7 for audit purposes.
h) If alerts are found, e.g. indicating a potential threat, the control server 5 sends an alert with relevant information to a User Interface (UI) on the control server 5.
i) alternatively or in addition to step h) the alert and relevant information may be sent to email or other alert mechanism.
j) the control server 5 may initiate remedial action or other response to the alerts as required. This response is detailed further in FIG. 11.

Figure 11:
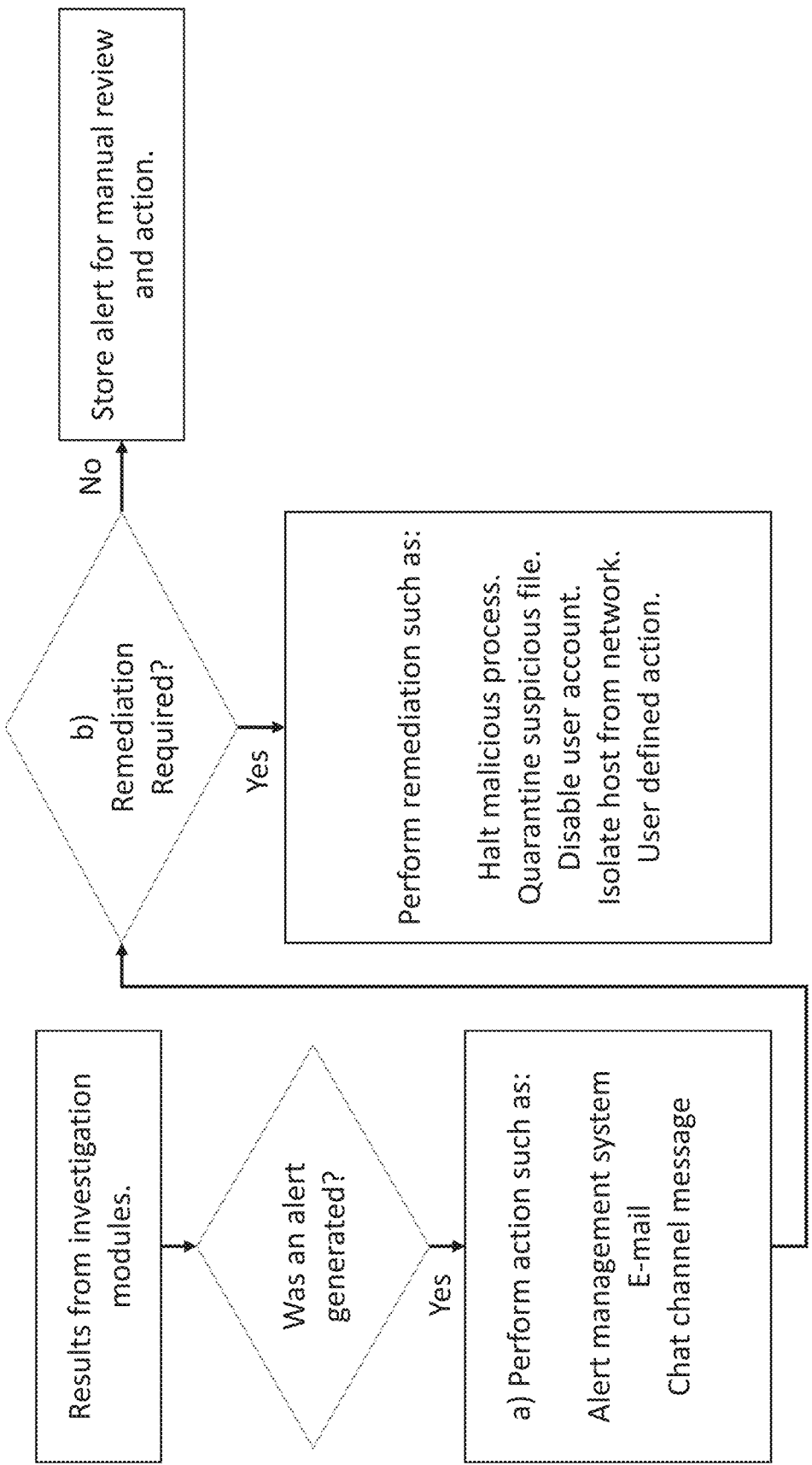
FIG. 11 shows a high-level schematic diagram of a method of investigation results management utilised by the investigation system.

FIG. 11 shows a flowchart of one embodiment of potential response processing to alerts being generated as a result of the process shown in FIG. 10 and includes the control server 5:

a) generating an alert via some form of alert management system which may include
 i. a UI alert for the User;
 ii. Email message to the User
 iii. Chat channel message
 iv. any other action communicating the alert to a User or system;
b) determining if remediation is required.
c) if remediation is required appropriate action may be made by sending instructions to the host computer 2 or administrator of the host computer 2 to, for example, halt a malicious process, quarantine a suspicious file, disable a user account, isolate the host computer 2 from network, a user defined action or any other action.
d) if remediation is not required or a compatible remediation action is unavailable the alert is stored in database or sent to the administrator of the host computer 2 for manual action.

The investigative modules 3 are standardized to return an easily parsed and cross-system compatible JSON object. JSON is easily indexed and stored in the investigation system 1 using databases such as Elasticsearch™.

The investigation system 1 uses Elasticsearch™ on the backend to make searching and aggregating data fast and easy. Any similar style of database could be used. The benefit of using JSON format for storing the investigation system data is that it is not only easily parsed but is also suitable for use with AI and Machine Learning systems that work well with loosely structured data in a way that traditional SQL systems cannot.

The investigation system 1 may collect an abundance of data from the host computers 2 it is protecting. Each scanning node 6 can be set to store all data collected, or just store data from failed security checks. The investigation system 1 can also store all data that may be required for compliance and auditing reasons. Or storage costs can be reduced by only holding onto data that is critical and shows a problem exists.

By collecting forensic data and storing it in database 7 for indexing and searching, the investigation system 1 is able to protect critical evidence data from tampering or removal on affected host computers 2. Collecting and storing data off the host computer 2 is important, as one of the primary tasks attackers do when they compromise a host computer 2 is to immediately remove their presence from log files and other audit trail to avoid detection.

When an investigative module 3 returns data indicating a problem the data is presented as part of a User Interface (UI). The data may include key pieces of information such as:
- Hostname
- Timestamp
- Relevant network addresses
- Process IDs
- User IDs
- Other relevant data
- Other key data related to the detected problem are gathered. This includes, but is not limited to:
  - Filenames and file data form attributes
  - Process data
  - Cryptographic hashes
  - Permissions
  - Environment variables
  - What was found that was suspicious
  - Why it was suspicious
  - What and administrator can do to validate the problem and take action This data may be shown in the UI within a browsing interface or can be accessed by third-party products directly through the REST API 10. Additionally, the investigation system 1 incorporates protection in the results against tampering by providing mechanisms for signing of collected data to show it has not been altered after it was retrieved.

The investigation system 1 is designed to work in a hostile environment and thus as state of a host computer 2 is unknown prior to investigation, it is assumed that there could be hostile actors present and that they may try to evade or tamper with security software trying to detect them.

The investigation system 1 addresses these threats in a number of defensive ways.

A—Encrypting and Self-Decrypting Modules

Investigative modules 3 may have anti-tamper functionality such that when sent to the remote host the investigative modules 3 are obfuscated, compressed, and then encrypted with a disposable key.

When executed, investigative modules 3 may decrypt and decompress themselves automatically. They will then run their investigative functions and delete themselves. Unprotected investigative module code and decryption passwords are ideally never stored on the host computer 2 disk. Even if the investigative module 3 is decrypted by a determined attacker, the code is still obfuscated to make reverse engineering a more involved task.

The above process ensures that if any investigative modules 3 are left on the host computer 2 (such as from a network timeout or other problem) they cannot be easily analysed. The SSH session storing the decryption keys no longer exists and the investigative modules 3 remaining on the host computer 2 cannot be easily read without the encryption key and then trying to de-obfuscate the code.

Encryption and obfuscation prevents attackers from understanding how each investigative module 3 works, what it is looking for, and how an attacker could modify their procedures to avoid detection.

B—Appear Unprotected

The lack of a software agent means that the host computer 2 appears to be unprotected. An attacker entering a host computer 2 and doing a cursory scan for active security software is simply unable to detect any presence that the investigation system 1 is guarding the host computer 2. The presence of SSH and Python is not enough to give away the investigation system's 1 presence as these two tools are so common as to be above suspicion.

Some malware is designed to look for signs of security software present and hide, disable, or otherwise bypass it. However, as the investigative modules 3 delete after running there are no traces left on disk that the host computer 2 has been investigated. Thus, this type of malware behaviour is ineffectual.

C—Randomness

As aforementioned, using an unpredictable schedule avoiding fixed times for security checks means that attackers have a harder task designing malware that can uninstall itself at predetermined times to avoid detection by the investigation system 1. Furthermore, the 'swarming' nature of the investigation system 1 sending only some investigative modules 3 at a time means that if a problem is found, additional investigative modules 3 can quickly be sent on demand to do a more in-depth search for problems. The slightest misstep by an attacker brings about an overwhelming response that makes evasion that much harder.

The investigation system 1 is architected to use scalable distributed scanning nodes 6 and command and control infrastructure that can work across public and/or private networks. This architecture allows the investigation system 1 to offer protection not only to conventional network servers, but also to provide protection to containerized applications (8, 9) and their host computers 2 in cloud environments.

The investigation system 1 also uses scheduling and security scanning methods that limits performance impacts on host computers 2. This method allows the investigation system 1 to work on a wide variety of systems providing comprehensive protection with a reduced impact on host computer resources.

The investigation system 1 can investigate the host computer 2 without requiring a specific software agent on the host computer 2. The investigation system may thus be deemed an 'agentless' investigation system.

Software agents require regular updates and can cause conflicts with other system updates that need to be installed. Agents may also use a persistent proportion of host computer resources, e.g. CPU, memory, GPU and other system resources e.g. an agent that requires a conservative average of 5% CPU time means customers need to operate 5% more servers due to this overhead. This is a significant cost for a large enterprise for no actual gain in security.

Furthermore, when software agents need to be updated, system administrators do so against every single host computer 2 that the agent is installed on. This process is fraught with problems and requires extensive testing to be sure the updates will not cause conflicts or failures with other loaded software. In addition to this, there is considerable risk doing automated deployment and upgrade of software agents across a network. Any problem caused by the agent or upgrade will impact countless host computers 2 and may cause serious disruptions to network operations.

In contrast, the investigation system's 1 agentless architecture does not require constant updates across many systems as new or updated investigative modules 3 need only be loaded to the investigation system server 5. If new updates are needed or new investigative modules 3 created, they are simply placed into the investigation system 1 and they can be used without the burden of upgrading hundreds, or thousands of host computers 2. Also, as the investigation system 1 is agentless it does not require a permanent presence on every host computer 2 which means no resources are being used constantly as you'd find with software agents.

The investigation system 1 also sends very small investigative modules 3 operable without an agent present on the host computer 2. These investigative modules 3 can perform investigations very quickly with low system impact as opposed to large monolithic scans found in the prior art. The use of small investigative modules 3 combined with the random scheduling nature of the investigation system 1 may thus provide superior real-time investigation of a host computer 2 with lower performance overhead.

The agentless nature of the investigation system 1 enables it to be used in a rapid deployment or emergency application to quickly detect, isolate and contain computer system compromises without needing to load software agents onto host computers 2. In an emergency, being agentless is important because loading software can alter the forensic integrity of the compromised host computer 2. It can also alert attackers or activate anti-forensic features of malware which could trigger destructive responses as the attacker or malware tries to evade detection.

Additionally, being agentless means that the investigation system 1 can secure containerized applications using Docker™ or similar platforms. Since there is no need to load an agent inside the container build specification, the investigation system 1 can provide security even to containers being distributed that have no built-in security protections by default.

The agentless nature of the investigation system 1 enables it be run when needed and then disappear from the host computer 2 when completed. For the investigation system 1, this feature provides anti-evasion and tamper resistance which increases security. Attackers can evade agent-based and regularly scheduled security checks if they know what is installed and when checks will happen.

Being agentless, the investigation system 1 can show up to a host computer 2 unannounced and perform random security checks that can take an attacker by surprise. Because nothing is loaded on the host computer 2 there is no indication it is being protected and this makes it harder for attackers to conceal their activity. Further, with no code present on the host computer 2 the product cannot be directly targeted for bypass and evasion by tampering as no software is left on protected hosts to invite attack.

Because it is agentless, the investigation system can be rapidly deployed without costly and time-consuming software installs. This ability to be rapidly deployed means that anyone from the smallest to the largest network would be a user of the investigation system 1. Since there is no agent to install, the investigation system 1 can quickly be deployed with lower risk to monitored host computers 2.

As discussed earlier, the agentless nature of the investigation system 1 means it can run on host computers 2 that serve containerized applications (such as Docker™ or Kubernetes™) as well. The agentless approach means that application containers can be checked either when they are running or at rest on the host computer 2 for signs of compromise. Because the investigation system 1 does not require an agent to run on each container to be protected, it means that we can assess containers for signs of compromise without impacting the services these containers provide.

Finally, many Internet of Thing (IoT) devices run embedded versions of Linux that are fully capable of running the investigative modules 3. As many IoT devices have limited RAM and CPU power they are not able to run full-time security agents. An agentless solution like the aforementioned investigation system 1 is a perfect candidate to provide security to these platforms as it is low impact and does not require any significant system resources to be constantly used.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein, the appended claims being interpreted according to the principles of patent law including the doctrine of equivalents.

APPENDIX A

Investigative Module Functions core dependency file for investigative modules to use.
boot dependency file for investigative modules to use.
looks for hidden directories in /bin, /sbin, /usr/bin, and /usr/sbin.
looks for hidden directories in the /dev directory
looks for hidden directories in the /dev/shm directory
looks for hidden directories in /lib, /var/lib, etc.
looks for hidden directory names that are extremely suspicious anywhere on the file system.
looks for hidden directory names that are extremely suspicious under /bin directories.
looks for hidden directory names that are extremely suspicious under /dev directories.
looks for hidden directory names that are extremely suspicious under /etc directories.
looks for hidden directory names that are extremely suspicious under /lib directories.
looks for hidden directory names that are extremely suspicious under the / top-level directory.
looks for hidden directory names that are extremely suspicious under /run and /var/run directories.
looks for hidden directory names that are extremely suspicious under /boot, /sys, and /lost+found directories.
looks for hidden directory names that are extremely suspicious under /tmp directories.
looks for hidden directory names that are extremely suspicious under a user's home directory.
looks for hidden directory names that are extremely suspicious under /usr/games and /usr/share/games directories.
looks for hidden directory names that are extremely suspicious under /usr/include
looks for hidden directory names that are extremely suspicious under /usr/local directories.
looks for hidden directory names that are extremely suspicious under /usr/share directories.
looks for hidden directory names that are extremely suspicious under /var directories.
looks for hidden directories in various system directories (/boot, /lost+found)
looks for hidden directories under /usr/games or /usr/share/games APPENDIX A-continued Investigative Module Functions looks for hidden directories under /usr/share/man
looks for an inconsistent link count anywhere on the file system. This means there is a directory present, but it is being hidden from view likely by a stealth rootkit.
looks for an inconsistent link count for bin directories. This means there is a directory present, but it is being hidden from view likely by a stealth rootkit.
looks for an inconsistent link count for dev directories. This means there is a directory present, but it is being hidden from view likely by a stealth rootkit.
looks for an inconsistent link count for /etc. This means there is a directory present, but it is being hidden from view likely by a stealth rootkit.
looks for an inconsistent link count for top level system lib directories. This means there is a directory present, but it is being hidden from view likely by a stealth rootkit.
looks for an inconsistent link count for the top level / directory. This means there is a directory present, but it is being hidden from view likely by a stealth rootkit.
looks for an inconsistent link count for top level system directories. This means there is a directory present, but it is being hidden from view likely by a stealth rootkit.
looks for an inconsistent link count for the top level /usr directory. This means there is a directory present, but it is being hidden from view likely by a stealth rootkit.
looks for an inconsistent link count for /usr/games, /usr/share/games. This means there is a directory present, but it is being hidden from view likely by a stealth rootkit.
looks for an inconsistent link count for /usr/local. This means there is a directory present, but it is being hidden from view likely by a stealth rootkit.
looks for an inconsistent link count for /usr/share. This means there is a directory present, but it is being hidden from view likely by a stealth rootkit.
looks for an inconsistent link count for the top level /var directory. This means there is a directory present, but it is being hidden from view likely by a stealth rootkit.
looks to see if a system shell has been renamed to /bin/false to hide the fact that an account can login.
looks if there is an encrypted or packed binary anywhere on the file system.
looks if there is an encrypted or packed binary in system cron directories.
looks if there is an encrypted or packed binary in system dev directories.
looks if there is an encrypted or packed binary in system etc directories.
looks if there is an encrypted or packed binary in system run directories.
looks if there is an encrypted or packed binary in system /boot, /lost+found, and similar directories.
looks if there is an encrypted or packed binary in system temp directories.
looks for executable files hidden anywhere on the file system.
looks for executable files hidden in system binary directories.
looks for executable files hidden in system /dev directory.
looks for executable files hidden in the /etc directory.
looks for executable files hidden in system lib directories.
looks for executable files hidden in the top level directory.
looks for executable files hidden in system /run directory.
looks for executable files hidden in system temp directories.
looks for executable files in system cron directories.
looks for executable files in system /dev directory.
looks for executable files in system /etc directory.
looks for executable files in system run directories.
looks for executable files in system temp directories.
looks for Linux executables named as a common non-executable extension to masquerade their presence anywhere on the file system.
looks for Linux executables named as a common non-executable extension to masquerade their presence in a system device directory.
looks for Linux executables named as a common non-executable extension to masquerade their presence in the /etc directory.
looks for Linux executables named as a common non-executable extension to masquerade their presence in a system library directory.
looks for Linux executables named as a common non-executable extension to masquerade their presence in the top level root directory.
looks for Linux executables named as a common non-executable extension to masquerade their presence in the /run directory.
looks for Linux executables named as a common non-executable extension to masquerade their presence in the /boot or /lost+found directories.
looks for Linux executables named as a common non-executable extension to masquerade their presence in a system temp directory.
looks to see if a system binary is in /dev where it shouldn't be.
looks to see if a system binary is in /etc where it shouldn't be.
looks to see if a system binary is in the top level directory where it shouldn't be.
looks to see if a system binary is in /run or /var/run where it shouldn't be.
looks to see if a system binary is in a system dir like /boot, /lost+found, and similar where it shouldn't be.
looks to see if a system binary is in /tmp where it shouldn't be.
looks to see if a system binary is in /usr/games or /usr/share/games where it shouldn't be.
looks to see if a system binary is in /usr/share/man where it shouldn't be.
looks to see if a system binary is in /var where it shouldn't be.
looks to see if a system binary is linked from dev directories.
looks to see if a system binary is linked from temp directories.
looks for system commands that have been poisoned to run malicious code when executed.
looks to see if a system binary has been renamed to a hidden file that still resides in system bin directories.

APPENDIX A-continued

| Investigative Module Functions |
| --- | looks for common files masquerading as one type when they are really another type anywhere on the file system.
looks for loadable kernel module config files that are being altered by a stealth rootkit to hide entries.
looks for packet capture pcap files anywhere on the file system.
looks for hidden packet capture pcap files anywhere on the file system.
looks for packet capture pcap files in the system binary directories.
looks for packet capture pcap files in the system cron directories.
looks for packet capture pcap files in the /dev directory.
looks for packet capture pcap files in the system /etc directory.
looks for packet capture pcap files in the system library directories.
looks for packet capture pcap files in the top-level system root directory.
looks for packet capture pcap files in the system run directories.
looks for packet capture pcap files in the system temp directories.
looks for packet capture pcap files in the system /var directories.
looks for a variety of common Linux rootkit files and directories present on a system.
looks to see if a system shell has been renamed to /sbin/nologin or /usr/sbin/nologin to hide the fact that an account can login.
looks to see if a system shell has been renamed to something else and put anywhere on the file system.
looks to see if a system shell has been renamed to something else and put in the system binary directories.
looks for common start-up scripts that have cloaked entries from a stealth rootkit.
looks to see if a SUID root binary is present in /dev directories.
looks to see if a SUID root binary is present in /etc directories.
looks to see if a SUID root binary is present in /run directories.
looks to see if a SUID root binary is present in /boot, /sys and /lost+found.
looks to see if a SUID root binary is present in /tmp directories.
looks to see if a SUID root binary is present in /usr/games or /usr/share/games directories.
looks to see if a SUID root binary is present in /usr/share directories.
looks to see if a SUID root binary is present in /usr/share/man directories.
looks for all SUID or SGID for any user binaries on the disk
looks to see if a common system editor like vi or nano is set SUID or SGID for any user to enable privilege escalation.
looks for all SUID or SGID root binaries on the disk
looks to see if a common system shells have been SUID or SGID to any user.
looks for suspicious named pipe device files under system binary directories. This is common with some kinds of backdoors.
looks for suspicious named pipe device files under /dev directories. This is common with some kinds of backdoors.
looks for suspicious named pipe device files under /etc directories. This is common with some kinds of backdoors.
looks for suspicious named pipe device files system library directories. This is common with some kinds of backdoors.
looks for suspicious named pipe device files under /run directories. This is common with some kinds of backdoors.
looks for suspicious named pipe device in system directories /boot, /sys and /lost+found. This is common with some kinds of backdoors.
looks for suspicious named pipe device files in /tmp. This is common with some kinds of backdoors.
looks for process PID files that are really binary executable files in disguise.
looks for process PID files that appear to be encrypted data and not process information.
looks for process PID files that contain more than just a standard integer value.
looks for process PID files that are too big to contain only running process data.
looks for evidence that user entries were zeroed out from the btmp file to hide login activity.
looks for log cleaning dropper files left behind in /tmp.
Compares lastlog entries against wtmp entries to see if any have been removed to conceal login activity.
looks for signs the MIG logcleaning tool has been run on the host.
looks for sloppy log tampering such as deleting system logs and replacing with files 0 bytes long.
looks for evidence that user entries were zeroed out from the utmp file to hide login activity.
looks to see if the system wtmp and lastlog audit records have been erased and made zero bytes long
looks to see if the system wtmp, utmp, and lastlog files are missing. Deleting these files disables login accounting on the system to hide activity.
looks for evidence that user entries were zeroed out from the wtmp file to hide login activity.
returns remote OS version information.
looks for system shells operating as a reverse or standard bindshell backdoor.
looks for netcat running as a reverse or standard bindshell backdoor on the system.
looks for perl scripts running as a reverse or standard bindshell backdoor on the system.
looks for php scripts running as a reverse or standard bindshell backdoor on the system.
looks for python scripts running as a reverse or standard bindshell backdoor on the system.
looks for ruby scripts running as a reverse or standard bindshell backdoor on the system.
looks for telnet running as a reverse or standard bindshell backdoor on the system.
looks for any process that is running with a listening network port, but has been deleted from the disk.
looks for any process that is running with a raw socket, but has been deleted from the disk.
looks for process that is running with a connected outbound port, but has been deleted from the disk.
looks for processes that are running, but the executable has been deleted from the disk.
checks any running process for signs that history file anti-forensics are in use.
looks for processes listening on a network port running out of dev directories.
looks for processes listening on a network port running out of the /proc directory.
looks for processes listening on a network port running out of tmp directories.

APPENDIX A-continued

Investigative Module Functions looks for any process that is running with a raw socket listening. This could be a backdoor or other malicious program.
looks for any process that is running with raw sockets listening for ICMP packets. This could be a sniffer or backdoor.
looks for any process that is running with raw sockets listening for TCP packets. This could be a sniffer or backdoor.
looks for any process that is running with raw sockets listening for UDP packets. This could be a sniffer or backdoor.
looks for any process that is running with raw sockets listening for unknown protocols. This could be a sniffer or backdoor.
looks for any process that is identical to another running process but has a different name.
looks for any process that is using mixed case in the name to masquerade as another process.
looks for a process that is really netcat, but is masquerading under a different name.
looks for a process that is really a shell, but is masquerading under a different name.
looks for a process that is really socat, but is masquerading under a different name.
looks for a process that is really strace, but is masquerading under a different name.
looks for a process that is really tcpdump, but is masquerading under a different name.
looks for loadable kernel modules that are hiding from view by a stealth rootkit.
looks for processes running with a pcap packet capture file open on the disk operating as a sniffer.
looks for scheduled at jobs that are suspicious or malicious.
looks for scheduled cron tasks that are suspicious or malicious.
looks for processes that are named as a Unix hidden file that are running (e.g. period as start of name)
looks for processes that are running out of /dev.
looks for processes that are running out of a hidden directory under a system binary directory.
looks for processes that are running out of a hidden directory under the /dev directory.
looks for processes that are running out of a hidden directory anywhere in their path.
looks for processes that are running out of a hidden directory under the /etc directory.
looks for processes that are running out of a hidden directory under a system library directory.
looks for processes that are running out of a hidden directory under the root (/) level directory.
looks for processes that are running out of a hidden directory under the /run directory.
looks for processes that are running out of a hidden directory under a system directory such as /boot, /lost+found or /sys.
looks for processes that are running out of a hidden directory under a system temp directory.
looks for processes that are running out of a hidden directory under the /usr directory.
looks for processes that are running out of a hidden directory under the /var directory.
looks for processes that are running out of /proc.
looks for processes that are running out the root user's home directory.
looks for processes that are running from a suspiciously named directory.
looks for processes that are running out of /boot, /sys and /lost+found directories.
looks for processes that are running out of /tmp directories.
looks for processes that are named as just one character which is commonly done with malware.
looks for perl scripts running out of dev directories.
looks for perl scripts running out of tmp directories.
looks for php scripts running out of dev directories.
looks for php scripts running out of tmp directories.
looks for python scripts running out of dev directories.
looks for python scripts running out of tmp directories.
checks running shell processes for signs that history file anti-forensics are in use.
looks for the strace command running on the remote host for an extended period.
looks for the strace command being used as a keylogger against SSH.
looks for processes with a whitespace as a name. This can conceal a malicious process name as one that looks legitimate.
looks for processes with a whitespace at the beginning or end of a name. This can conceal a malicious process name as one that looks legitimate.
looks to see if the user's history is linked to /dev/null which will conceal command history.
looks for inactive accounts with a valid shell history file in their home directories indicating a login has happened.
checks if a user's home directory is /dev/null which sometimes is done by attackers to conceal activity.
lists root UID 0 users that are not named root which is done to hide superuser accounts.
looks for any user with no password set.
checks user login and logout scripts for anti-forensic tactics to prevent logging their command history.
checks user login scripts for malicious commands that can compromise the system.
looks for inactive accounts with valid ssh login keys in their home directory.
is a dependency for investigative modules to use to assess system files.
is a dependency file for investigative modules to use to look at system process information.

The invention claimed is:

1. A method of investigating a remote host computer by using an investigation system remote to the remote host computer, the investigation system including at least one computer system with a computer processor coupled to a system memory and programmed with computer-readable instructions, the method comprising:

the investigation system establishing a connection with the remote host computer;

the investigation system sending a first investigative module to the remote host computer, the first investigative module configured to run on the remote host computer to perform at least one investigative function to investigate the remote host computer to ascertain if the remote host computer has any data or process, collectively referred to as data forms, with suspicious data form attributes, wherein the first investigative module is an agentless computer program, being thus capable of running on the remote host computer without requiring a software agent on the remote host computer;

the investigation system sending a second investigative module to the remote host computer, the second investigative module including data utilizable by the first investigative module, the data comprising instructions for the first investigative module to perform the at least one investigative function;

the remote host computer running at least the first investigative module; and causing at least the first investigative module to be removed from the remote host computer;

wherein the first investigative function is performable by the remote host computer running the first investigative module without any connection between the investigation system and the remote host computer.

2. The method of claim 1, wherein the first investigative module is run on the remote host computer according to an unpredictable time schedule.

3. The method of claim 2, wherein the investigation system is configured to generate the unpredictable time schedule, the unpredictable time schedule including a randomly generated execution time for each investigative module, or group thereof.

4. The method of claim 3, wherein the randomly generated execution time is sent to the remote host computer as computer readable instructions or data instructing the remote host computer to run the corresponding investigative module, or group thereof.

5. The method of claim 3, wherein the investigation system is configured to perform the step of establishing the connection to the remote host computer at the execution time and send the first and second investigative modules to the remote host computer.

6. The method of claim 2, wherein the investigation system is configured to send the second investigative module to the remote host computer at the execution time.

7. The method of claim 1, wherein the second investigative module includes instructions for the first investigative module to execute the performance of the at least one investigative function upon detection of an unpredictable trigger.

8. The method of claim 1, wherein the investigation system is configured to send further investigative modules to the remote host computer, the further investigative modules selected from a plurality of investigative modules, the plurality of investigative modules collectively forming an 'investigative module library'.

9. The method of claim 8, wherein the selection of investigative modules is unpredictable.

10. The method of claim 9, wherein the investigation system is configured to generate or receive a specification of a percentage value indicating a proportion of the selected investigative modules to run.

11. The method of claim 8, wherein the investigation system is configured to perform a non-contiguous investigation by running the investigative modules non-contiguously.

12. The method of claim 1, wherein the investigation system includes a scheduler configured to modify parameters to provide an unpredictable schedule of investigative modules to be run on the remote host computer, the parameters including:

a time window and/or execution time in which to send and/or run the at least one investigative module;

a selection of investigative modules to run;

a percentage value indicating a proportion of investigative modules to run.

13. The method of claim 1, wherein the investigation system includes at least one control server and at least one scanning node, the at least one scanning node establishing the connection to the remote host computer and being connectable to the control server.

14. The method of claim 13, wherein the scanning node and control server use asymmetrical cryptography to store login credentials for the remote host computer, the scanning node holding a private key and the control server holding a public key.

15. The method of claim 1, wherein a said investigative module includes data comprising computer-readable instructions to perform a singular investigative function.

16. The method of claim 1, wherein a said investigative module is configured to run on the remote host computer independently from the investigation system such that the first investigative module can perform the investigative function without requiring the investigation system to be connected to the remote host computer.

17. The method of claim 1, wherein a said investigative module is configured to be inoperable when sent to the remote host computer.

18. The method of claim 1, further including removing all investigative modules from the remote host computer.

19. The method of claim 1, further including instructing the remote host computer to create a directory with an unpredictable name and sending the first investigative module to the directory.

20. The method of claim 19, wherein the directory is created in RAM on the remote host computer.

21. The method of claim 19, further including removing the directory.

22. The method of claim 1, wherein the at least one investigative module is encrypted with a disposable key.

23. The method of claim 1, wherein the at least one investigative module is a computer program with code that is obfuscated.

24. The method of claim 1, wherein the at least one investigative module is a computer program with code that is compressed.

25. The method of claim 1, wherein the first investigative module is a computer program configured to send data to the investigation system indicating a request for at least one additional investigative module be sent to the remote host computer, the method including sending the second investigative module to the remote host computer upon receipt of the request.

26. The method of claim 1, wherein a said investigative module is configured to generate investigation data including results of the investigative function performed by a said investigative module.

27. The method of claim 26, wherein the investigation data is written to an electronic file on the remote host computer.

28. The method of claim 26, wherein the at least one investigative module is configured to send the investigation data to the investigation system without providing data retrieved from the remote host computer.

29. The method of claim 26, wherein the first investigative module is configured to generate investigation data in the form of alert data and send the alert data to the investigation system if it is stopped, removed prematurely or returns investigation data of unexpected data type or content.

30. The method of claim 1, wherein the first investigative module is a computer program configured to investigate a container on the remote host computer.

31. The method of claim 1, wherein the remote host computer is deemed to be in an unsuspicious state when all the data form attributes comply with corresponding predefined integrity status and a data form is considered suspicious when at least one data form attribute differs from the predefined integrity status.

32. The method of claim 1, wherein a said investigative function comprises investigating the remote host computer for files with suspicious data form attributes, wherein the suspicious data form attributes comprise at least one of:
- files with at least one data form attribute matching a corresponding predefined data form attribute stored in data in a said investigative module;
- files having at least one data form attribute differing from a corresponding predefined data form attribute stored in data in a said investigative module;
- files with entropy exceeding a predefined threshold value stored in data in a said investigative module;
- files containing payloads or backdoors matching predefined signatures or attributes stored in data in a said investigative module.

33. The method of claim 1, wherein a said investigative function comprises investigating the remote host computer for processes with suspicious data form attributes, wherein the suspicious data form attributes are selected from at least one of:
- processes with at least one data form attribute matching a corresponding predefined data form attribute stored in data in a said investigative module;
- processes having at least one data form attribute differing from a corresponding predefined attribute stored in data in a said investigative module;
- processes without corresponding running binaries on the disk;
- processes running from locations on the remote host computer matching a corresponding predefined location stored in data in a said investigative module.

34. The method of claim 1, wherein a said investigative function comprises investigating the remote host computer for users with suspicious data form attributes, wherein the suspicious data form attributes are at least one of:
- a user attribute matching a corresponding predefined user data form attribute stored in data in a said investigative module;
- a user attribute differing to a corresponding predefined user data form attribute stored in data in a said investigative module;
- a user attribute indicating the user has deleted a corresponding command history or linked their command history to a location;
- user login data form attributes matching predefined login data form attributes stored in data in a said investigative module;
- user authentication tokens with data form attributes matching predefined authentication token data form attributes stored in data in a said investigative module.

35. The method of claim 1, wherein a said investigative function comprises investigating the remote host computer for directories with suspicious data form attributes, wherein the suspicious directory data form attributes include directories with at least one of:
- a data form attribute matching a corresponding predefined data form attribute stored in data in a said investigative module;
- a data form attribute differing from a corresponding predefined data form attribute stored in data in a said investigative module;
- a link count that does not match a corresponding predefined link count stored in data in a said investigative module.

36. The method of claim 1, wherein a said investigative function comprises investigating the remote host computer for logs with suspicious data form attributes, wherein the suspicious data form attributes are at least one of:
- a log data form attribute matching a corresponding predefined data form attribute stored in data in a said investigative module;
- a log data form attribute differing from a corresponding predefined data form attribute stored in data in a said investigative module;
- a system log data form attribute differing from a corresponding predefined system log data form attribute stored in data in a said investigative module;
- absence or modification of a log file matching corresponding predefined data form attributes stored in data in a said investigative module, the predefined data form attributes corresponding to the log file.

37. The method of claim 1, wherein a said investigative function comprises investigating the remote host computer for host computer information data form attributes, wherein the remote host computer information data form attributes are at least one of:
- operating system information;
- hardware information;
- network information;
- user information, including data of logged-in users and users with valid accounts;
- information on the remote host computer about all running process IDs and process names;
- log data on the remote system, including audit logs, kernel logs, process logs;
- cryptographic hashes of running processes;
- in use network ports and information about the systems to which the remote host computer is connected;
- memory and kernel structures;
- scheduled tasks.

38. An investigation system for performing a method of investigating a remote host computer, the investigation system including at least one computer system with a computer processor coupled to a system memory and programmed with computer-readable instructions, the investigation system configured to:
- establish a connection with the remote host computer;
- send a first investigative module to the remote host computer, the first investigative module configured to run on the remote host computer to perform at least one investigative function on the remote host computer to investigate the remote host computer to ascertain if the remote host computer has any data or process, collectively defined as data forms, with suspicious data form attributes, wherein the first investigative module is an agentless computer program, being thus capable of running on the remote host computer without requiring a software agent on the remote host computer; and
- send a second investigative module to the remote host computer, the second investigative module including data utilizable by the first investigative module, the data comprising instructions for the first investigative module to perform the at least one investigative function, or another investigative function;

wherein the host computer runs at least the first investigative module;

wherein the first investigative function is performable by the remote host computer running the first investigative module without any connection between the investigation system and the remote host computer; and wherein at least the first investigative module is removed from the remote host computer.

39. The investigation system of claim 38, including at least one control server and at least one scanning node, the at least one scanning node establishing the connection to the remote host computer and being connectable to the control server.

* * * * *